(12) United States Patent
Myung et al.

(10) Patent No.: US 11,405,150 B2
(45) Date of Patent: Aug. 2, 2022

(54) METHOD BY WHICH TERMINAL TRANSMITS DATA IN UNLICENSED BAND, AND APPARATUS FOR USING METHOD

(71) Applicant: LG ELECTRONICS INC., Seoul (KR)

(72) Inventors: Sechang Myung, Seoul (KR); Seonwook Kim, Seoul (KR); Suckchel Yang, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 13 days.

(21) Appl. No.: 16/980,342

(22) PCT Filed: May 10, 2019

(86) PCT No.: PCT/KR2019/005651
§ 371 (c)(1),
(2) Date: Sep. 11, 2020

(87) PCT Pub. No.: WO2019/216705
PCT Pub. Date: Nov. 14, 2019

(65) Prior Publication Data
US 2021/0044392 A1   Feb. 11, 2021

Related U.S. Application Data

(60) Provisional application No. 62/669,960, filed on May 10, 2018.

(30) Foreign Application Priority Data

Aug. 9, 2018 (KR) .................. 10-2018-0092982
Nov. 2, 2018 (KR) .................. 10-2018-0133429
Mar. 28, 2019 (KR) .................. 10-2019-0036094

(51) Int. Cl.
H04L 1/18 (2006.01)
H04L 5/00 (2006.01)
(Continued)

(52) U.S. Cl.
CPC .......... *H04L 1/1893* (2013.01); *H04L 5/0007* (2013.01); *H04L 5/0044* (2013.01);
(Continued)

(58) Field of Classification Search
None
See application file for complete search history.

(56) References Cited

U.S. PATENT DOCUMENTS 10,574,404 B2 * 2/2020 Kim ................... H04L 1/0067
2018/0234881 A1 * 8/2018 Hosseini ............. H04L 1/1864
(Continued)

FOREIGN PATENT DOCUMENTS

KR   20170120637   10/2017

OTHER PUBLICATIONS

PCT International Application No. PCT/KR2019/005651, International Search Report dated Aug. 13, 2019, 2 pages.
(Continued)

*Primary Examiner* — Ajit Patel
(74) *Attorney, Agent, or Firm* — Lee Hong Degerman Kang Waimey

(57) ABSTRACT

A method by which terminal transmits data in an unlicensed band, and an apparatus using the method are provided. The method comprises: transmitting codeblock groups (CBGs) to a base station by using a first resource within the unlicensed band; and re-transmitting at least one CBG, in which a negative acknowledgement (NACK) is received, of the CBGs to the base station by using a second resource within the unlicensed band, wherein the second resource is determined on the basis of the proportion of the CBGs to the at least one CBG in which the NACK is received.

18 Claims, 24 Drawing Sheets

(51) Int. Cl.
  *H04W 16/14* (2009.01)
  *H04W 72/12* (2009.01)
  *H04W 72/14* (2009.01)
  *H04W 74/08* (2009.01)

(52) U.S. Cl.
  CPC ....... *H04W 16/14* (2013.01); *H04W 72/1268* (2013.01); *H04W 72/14* (2013.01); *H04W 74/0808* (2013.01)

(56) References Cited

U.S. PATENT DOCUMENTS

| | | | | |
|---|---|---|---|---|
| 2018/0270022 A1* | 9/2018 | Sun | .................. | H04L 1/1896 |
| 2018/0287745 A1* | 10/2018 | Sun | .................. | H04L 1/1864 |
| 2019/0363833 A1* | 11/2019 | Wang | .................. | H04L 5/0082 |
| 2020/0154309 A1* | 5/2020 | Takeda | .................. | H04L 1/1614 |
| 2020/0170033 A1* | 5/2020 | Gao | .................. | H04W 72/1289 |
| 2020/0235759 A1* | 7/2020 | Ye | .................. | H03M 13/116 |
| 2020/0336274 A1* | 10/2020 | Yoshioka | .................. | H04L 5/10 |

OTHER PUBLICATIONS

MediaTek Inc., "Discussion on CBG construction for CBG-based (re)transmission," 3GPP TSG RAN WG1 NR Ad-Hoc#2, R1-1710830, Qingdao, P.R. China, Jun. 27-30, 2017, 8 pages.

Catt, "Open issues on CBG-based (re)transmission," 3GPP TSG RAN WG1 Meeting #92, R1-1801737, Athens, Greece, Feb. 26-Mar. 2, 2018, 4 pages.

3GPP; TSG RAN; NR; Physical layer procedures for control (Release 15), 3GPP TS 38.213 V15.1.0 (Mar. 2018), 79 pages.

Lenovo et al., "CBG construction for CBG-based retransmission," 3GPP TSG RAN WG1 NR Ad-Hoc#2, R1-1710602, Qingdao, P.R. China, Jun. 27-30, 2017, 7 pages.

* cited by examiner

METHOD BY WHICH TERMINAL TRANSMITS DATA IN UNLICENSED BAND, AND APPARATUS FOR USING METHOD

CROSS-REFERENCE TO RELATED APPLICATIONS

This application is the National Stage filing under 35 U.S.C. 371 of International Application No. PCT/KR2019/005651, filed on May 10, 2019, which claims the benefit of U.S. Provisional Application No. 62/669,960, filed on May 10, 2018, and also claims the benefit of earlier filing date and right of priority to Korean Application Nos. 10-2018-0092982, filed on Aug. 9, 2018, 10-2018-0133429, filed on Nov. 2, 2018, and 10-2019-0036094, filed on Mar. 28, 2019, the contents of which are all hereby incorporated by reference herein in their entirety.

TECHNICAL FIELD

The present disclosure relates to wireless communication, and more particularly, to a method of transmitting data of a UE in an unlicensed band and a device using the method.

BACKGROUND ART

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultra-reliable and low latency communication (URLLC) is discussed. This new technology may be called new radio access technology (new RAT or NR) in the present disclosure for convenience.

In a cellular communication system such as LTE/NR, methods of using unlicensed bands such as 2.4 GHz mainly used in Wi-Fi system or unlicensed bands such as 5 GHz and 60 GHz which newly attract attention for traffic offloading are under discussion.

Since an unlicensed band is based on the assumption that wireless transmission and reception are performed through contention between communication nodes, it is necessary for each communication node to perform channel sensing before signal transmission to check whether another communication node has not transmitted a signal. This operation is called LBT (Listen before Talk) or a channel access procedure (CAP) for convenience, and particularly, an operation of checking whether another communication node transmits a signal is defined as carrier sensing (CS) and a case in which it is determined that another communication node does not transmit a signal is defined as confirmation of clear channel assessment (CCA).

In the aforementioned channel access procedure, a channel is sensed in a predetermined time period before data transmission, and when the channel is available in the predetermined time period, data is transmitted when the value of a random backoff counter is 0. Here, the initial value of the counter is determined on the basis of a value which is a contention window size.

Meanwhile, the method of transmitting data of a terminal (i.e., user equipment (UE)) in an unlicensed band may include granted uplink transmission (GUL) transmission of transmitting data based on a dynamic UL grant and configured uplink transmission (CUL) transmission of transmitting data without the dynamic UL grant. CUL is a method in which a base station (BS) (or eNB) configures uplink resources for a UE in advance (via higher layer signals, etc.), and then when CUL is activated, the UE transmits data using the configured uplink resources without a dynamic UL grant.

During uplink transmission, the UE may transmit data in units of a transport block (TB) or in units of a code block or a code block group (CBG) configuring the transport block as in the related art.

When transmission in units of CUL and CBG is configured in an unlicensed band, the related art data transmission method may be inefficient. For example, in CUL, data is transmitted/retransmitted using preconfigured resources. Even if information indicating that reception has failed for only some of the CBGs transmitted by the UE is fed back, retransmission is performed using the preconfigured resources, and thus resources may be wasted.

DISCLOSURE

Technical Problem

An aspect of the present disclosure provides a method of transmitting data of a UE in an unlicensed band and an device using the method.

Technical Solution

In one aspect, provided is a method of transmitting data of a user equipment (UE) in an unlicensed band. The method includes transmitting codeblock groups (CBGs) to a base station (BS) using a first resource in the unlicensed band, receiving acknowledgement/negative acknowledgement (ACK/NACK) in response to the CBGs, and retransmitting at least one CBG for which NACK is received as a response, among the CBGs, to the BS using a second resource in the unlicensed band. The second resource is determined based on a ratio of the CBGs and the at least one CBG for which the NACK is received.

Information on the second resource may be transmitted together when the at least one CBG for which the NACK is received is retransmitted.

The method may further include receiving ACK/NACK information on the CBGs.

The ACK/NACK information may include ACK/NACK for each of the CBGs.

The ACK/NACK information may include the ACK/NACK for each of CBGs included in one transport block (TB) among the CBGs, bundled through an AND operation or an OR operation.

A size of a contention window of the UE may be adjusted based on the ACK/NACK information.

The first resource and the second resource may be included in uplink transmission resources previously configured for the UE.

The UE may perform a listen before talk (LBT) process to determine whether another communication node currently uses a channel before transmission using the first resource.

The UE may perform the LBT process to determine whether another communication node currently uses a channel before retransmission using the second resource.

The method may further include receiving an uplink grant and transmitting a specific CBG through a resource scheduled by the uplink grant.

ACK/NACK information on the specific CBG may be received together with ACK/NACK information on the CBG transmitted using the first resource.

The specific CBG may be not retransmitted even if NACK for the specific CBG is received.

An amount of the second resource may be obtained by scaling an amount of the first resource based on the ratio in a time domain or a frequency domain.

The retransmission may be performed using the second resource if the ratio of the number of CBGs and the number of at least one CBG for which NACK is received as a response among the CBGs or the number of the at least one CBG is equal to or greater than a specific value, and the retransmission may be performed using a resource allocated by an uplink grant if the ratio is less than the specific value.

An amount of the second resource may be a smallest value among resource amounts for transmitting the at least one CBG for which the NACK is received as a response.

When an amount of the first resource is R and a ratio obtained by dividing the number of the at least one CBG for which the NACK is received as a response by the number of the CBGs is S, an amount of the second resource may be obtained as ceil(R×S), and the second resource may be selected from a resource having a lowest index or a highest index among resources having the resource amount of R.

In another aspect, provided is a user equipment. The user equipment includes a transceiver configured to transmit and receive a wireless signal and a processor operatively coupled with the transceiver. The processor is configured to transmit codeblock groups (CBGs) to a base station (BS) using a first resource in the unlicensed band, receive acknowledgement/negative acknowledgement (ACK/NACK) in response to the CBGs, and retransmit at least one CBG for which NACK is received as a response, among the CBGs, to the BS using a second resource in the unlicensed band. The second resource is determined based on a ratio of the CBGs and the at least one CBG for which the NACK is received.

The user equipment may communicate with at least one of a mobile terminal, a network, and an autonomous vehicle other than the user equipment.

In still another apsect, provided is a processor for a wireless communication device in a wireless communication system. The processor is configured to control the wireless communication device to transmit codeblock groups (CBGs) to a base station (BS) using a first resource in the unlicensed band, receive acknowledgement/negative acknowledgement (ACK/NACK) in response to the CBGs, and retransmit at least one CBG for which NACK is received as a response, among the CBGs, to the BS using a second resource in the unlicensed band. The second resource is determined based on a ratio of the CBGs and the at least one CBG for which the NACK is received.

In a situation where transmission in units of CUL and CBG in an unlicensed band is configured, if information indicating that reception has failed for only some of the CBGs transmitted by the UE is fed back, a preset resource is determined according to a proportion of the reception-failed CBGs and the some CBGs may be retransmitted through the determined resource, thereby reducing a waste of resource. In addition, it is possible to increase reliability of retransmission by providing the BS with information on the determined resource.

MODE FOR DISCLOSURE

Figure 1:
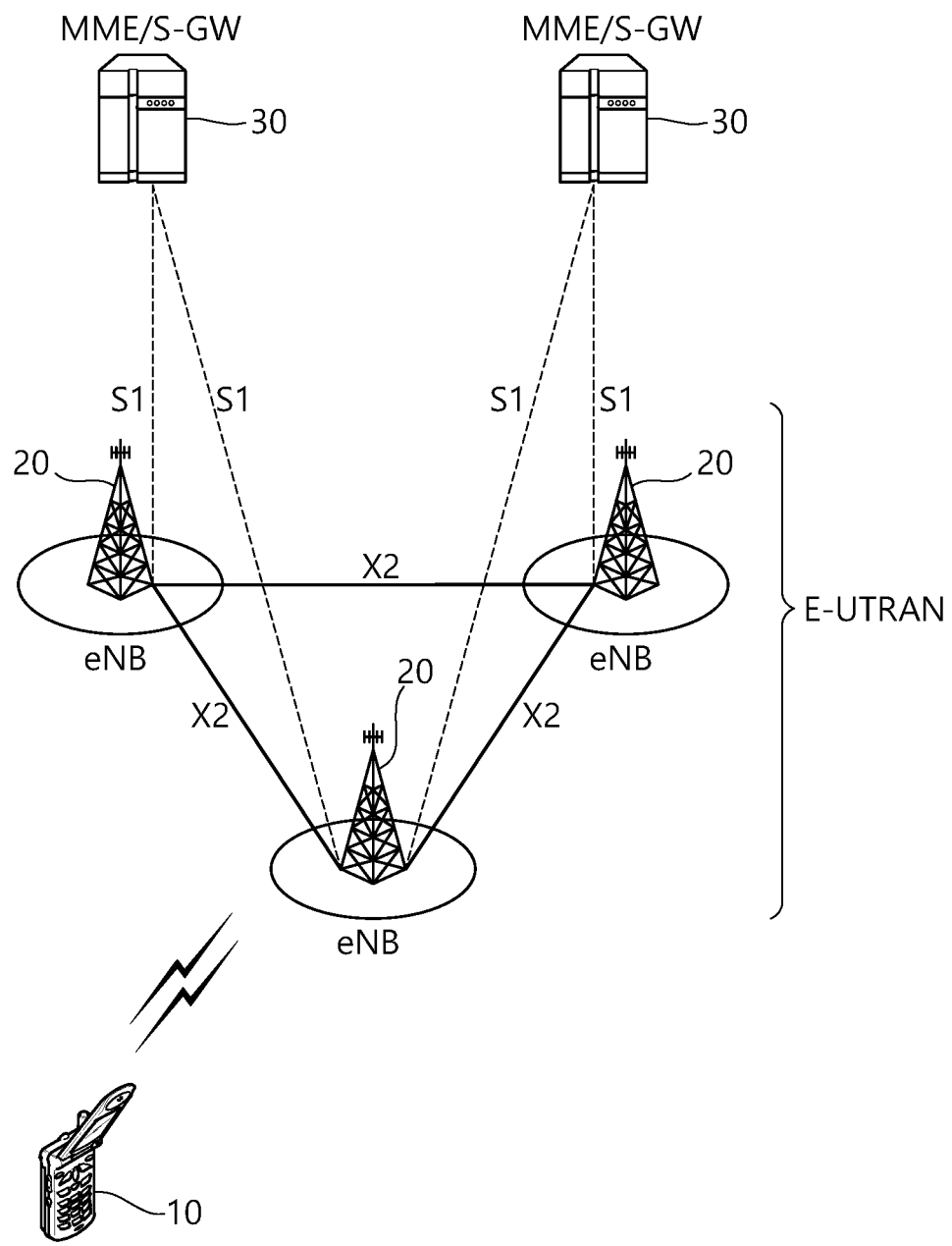
FIG. 1 shows a wireless communication system to which the present disclosure may be applied.

FIG. 1 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an Si interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
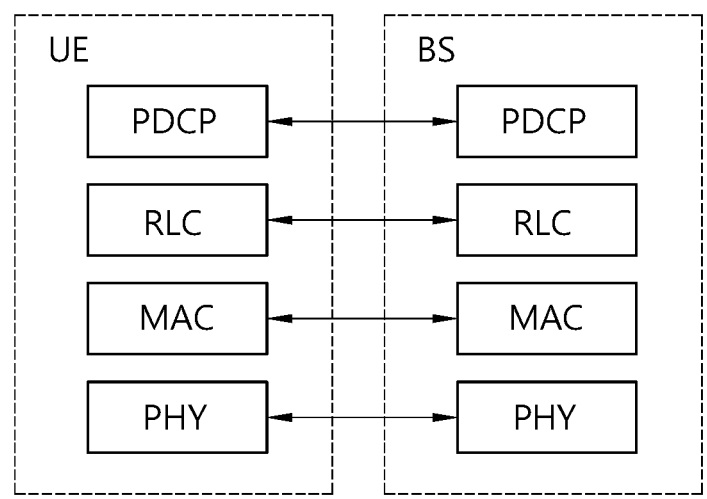
FIG. 2 is a diagram showing a wireless protocol architecture for a user plane.
Figure 3:
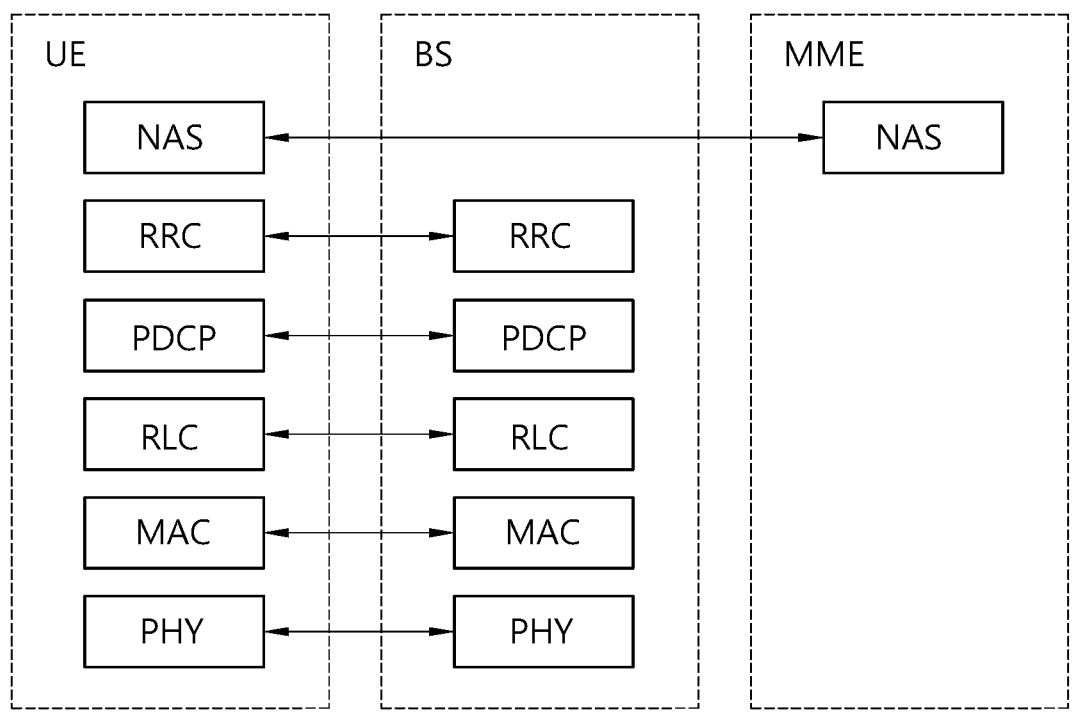
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 4:
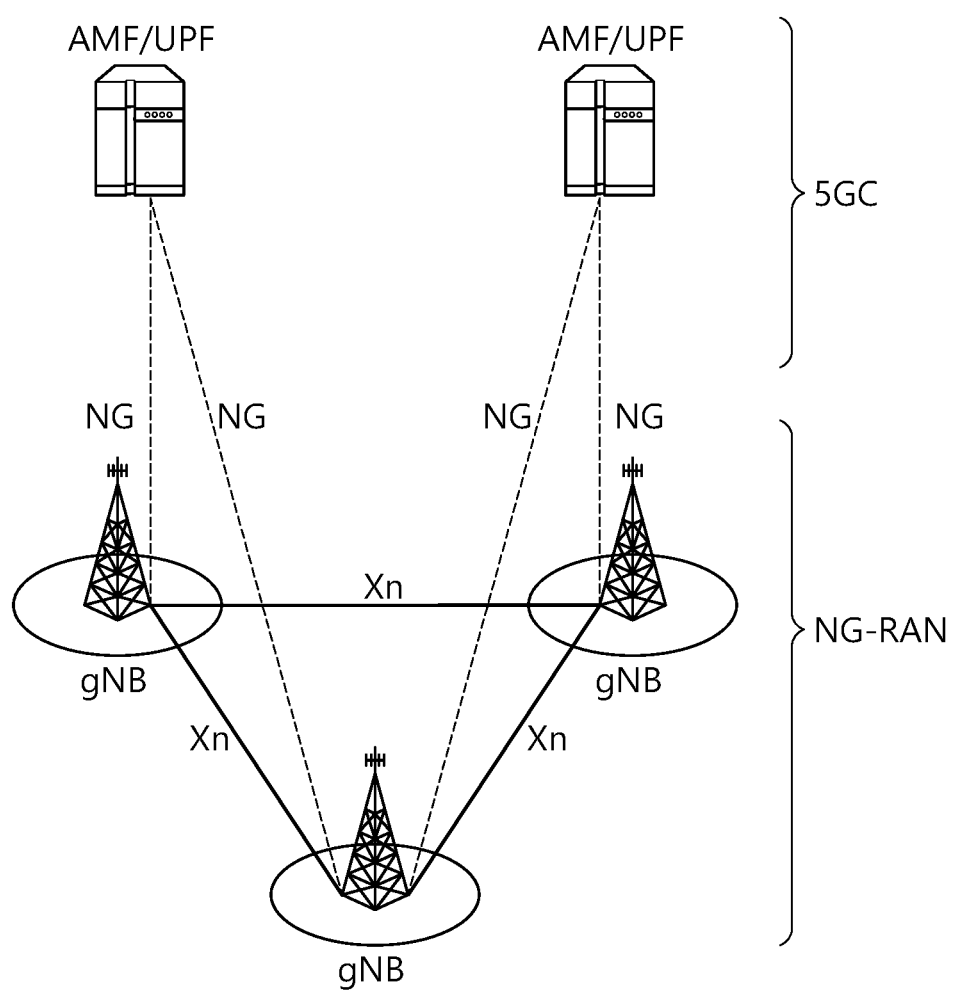
FIG. 4 illustrates a system structure of a next generation radio access network (NG-RAN) to which NR is applied.

FIG. 4 illustrates a system structure of a next generation radio access network (NG-RAN) to which NR is applied.

Referring to FIG. 4, the NG-RAN may include a gNB and/or an eNB that provides user plane and control plane protocol termination to a terminal. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

Figure 5:
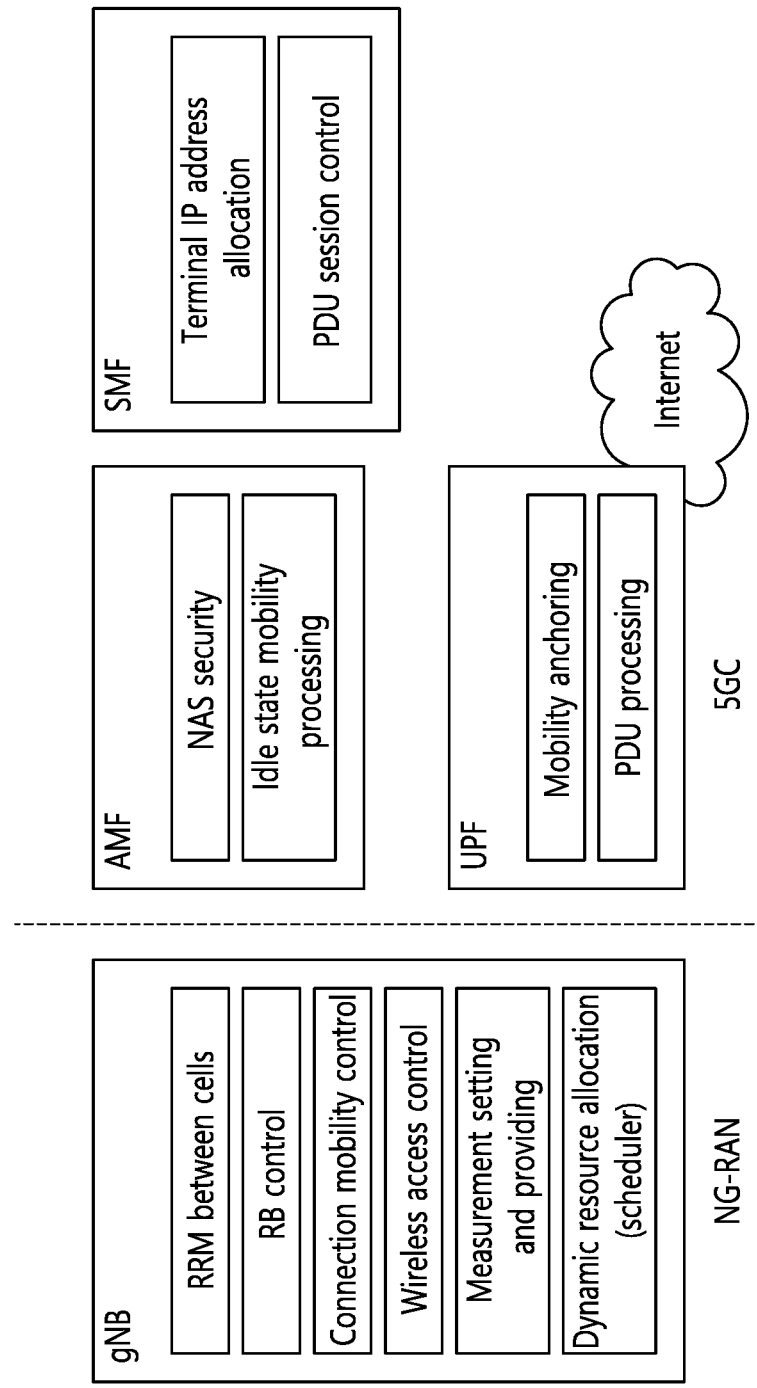
FIG. 5 illustrates a functional division between an NG-RAN and a SGC.

FIG. 5 illustrates a functional division between an NG-RAN and a 5GC.

The gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
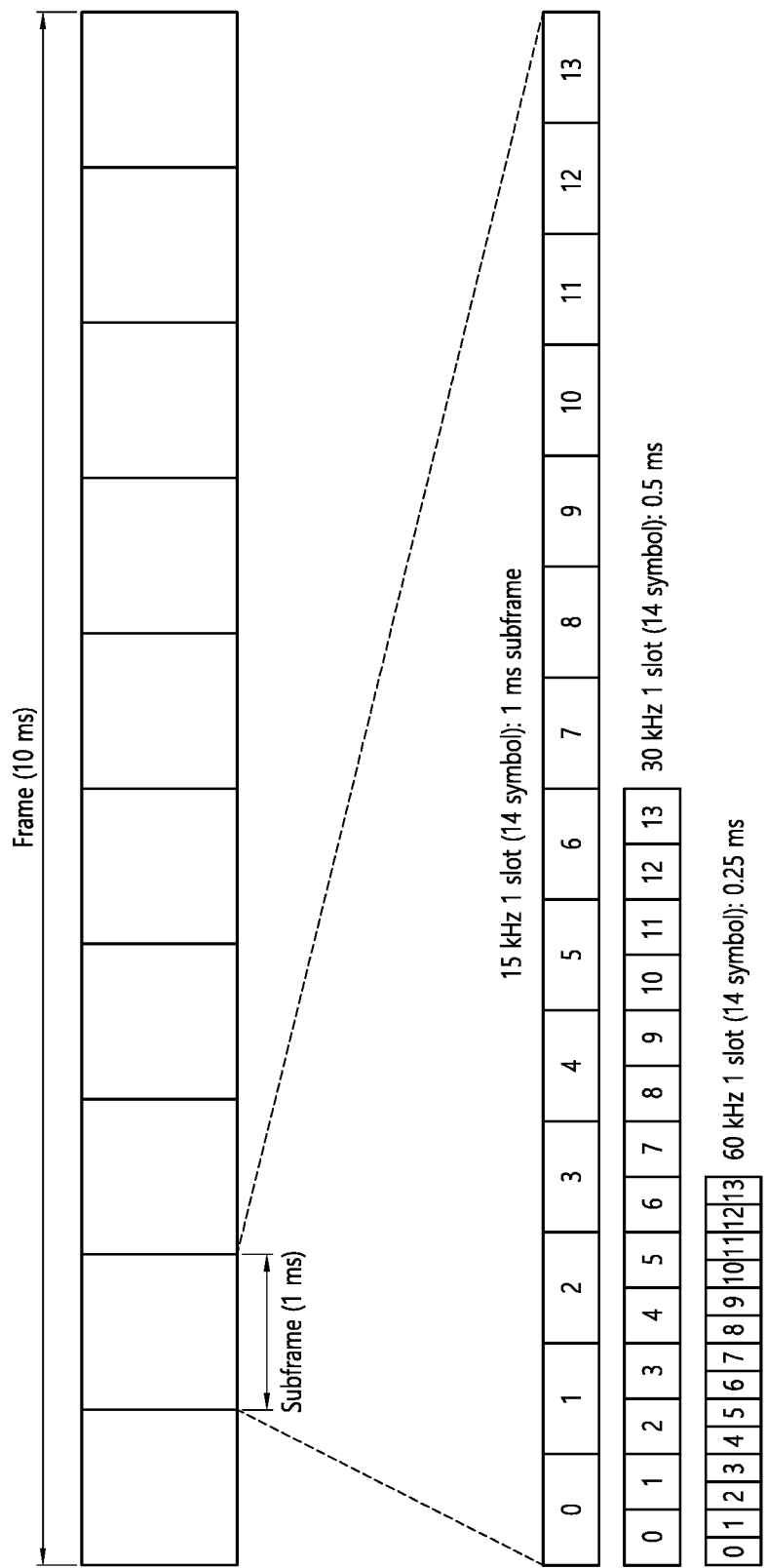
FIG. 6 illustrates an example of a frame structure that may be applied in NR.

FIG. 6 illustrates an example of a frame structure that may be applied in NR.

Referring to FIG. 6, a frame may be composed of 10 milliseconds (ms) and include 10 subframes each composed of 1 ms.

One or a plurality of slots may be included in a subframe according to subcarrier spacings.

The following table 1 illustrates a subcarrier spacing configuration μ.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal<br>Extended |
| 3 | 120 | normal |
| 4 | 240 | normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations μ.

TABLE 2

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

In FIG. 6, μ=0, 1, 2 is illustrated.

A physical downlink control channel (PDCCH) may include one or more control channel elements (CCEs) as illustrated in the following table 3.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Meanwhile, in a future wireless communication system, a new unit called a control resource set (CORESET) may be introduced. The terminal may receive the PDCCH in the CORESET.

Figure 7:
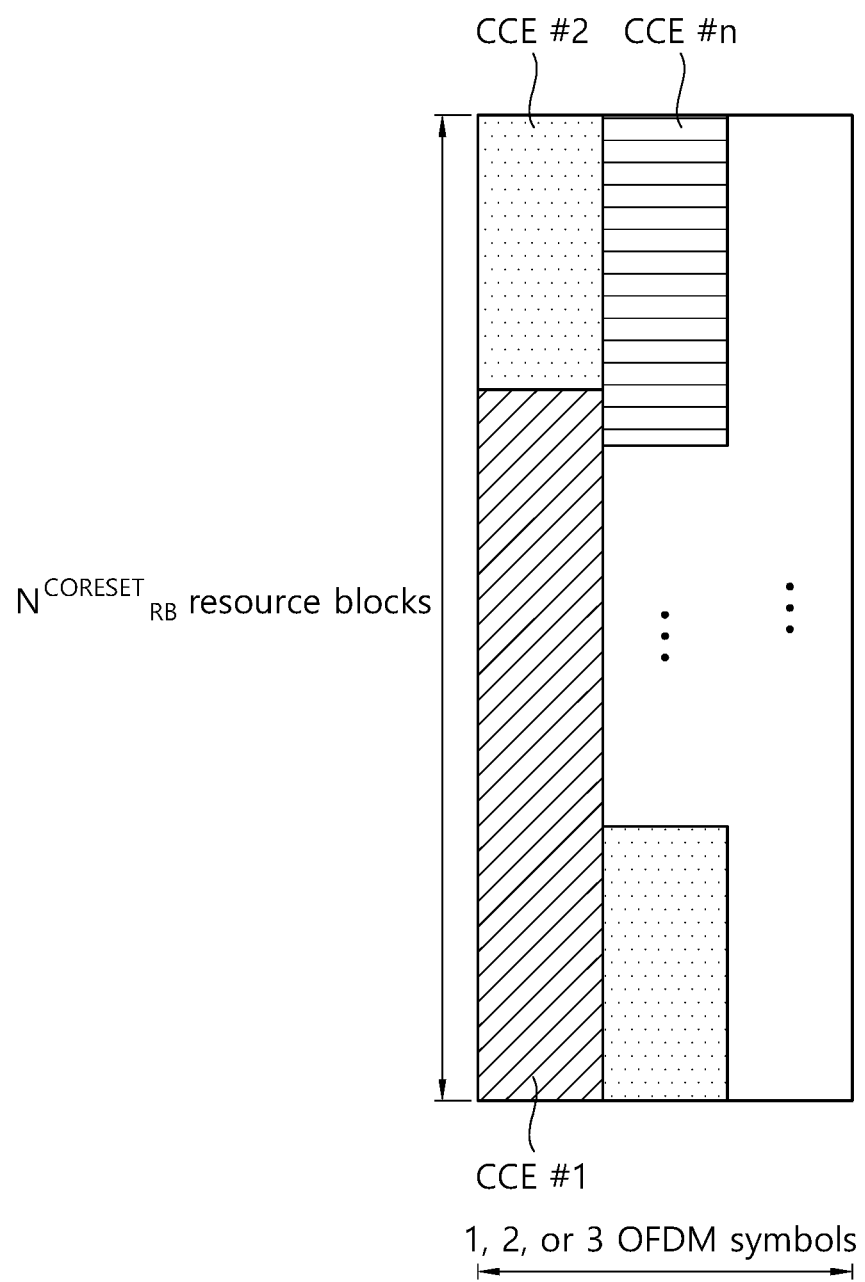
FIG. 7 illustrates CORESET.

FIG. 7 illustrates CORESET.

Referring to FIG. 7, the CORESET includes $N^{CORESET}_{RB}$ number of resource blocks in the frequency domain, and $N^{CORESET}_{symb}\{1, 2, 3\}$ number of symbols in the time domain. $N^{CORESET}_{RB}$ and $N^{CORESET}_{symb}$ may be provided by a base station via higher layer signaling. As illustrated in FIG. 7, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the terminal.

Figure 8:
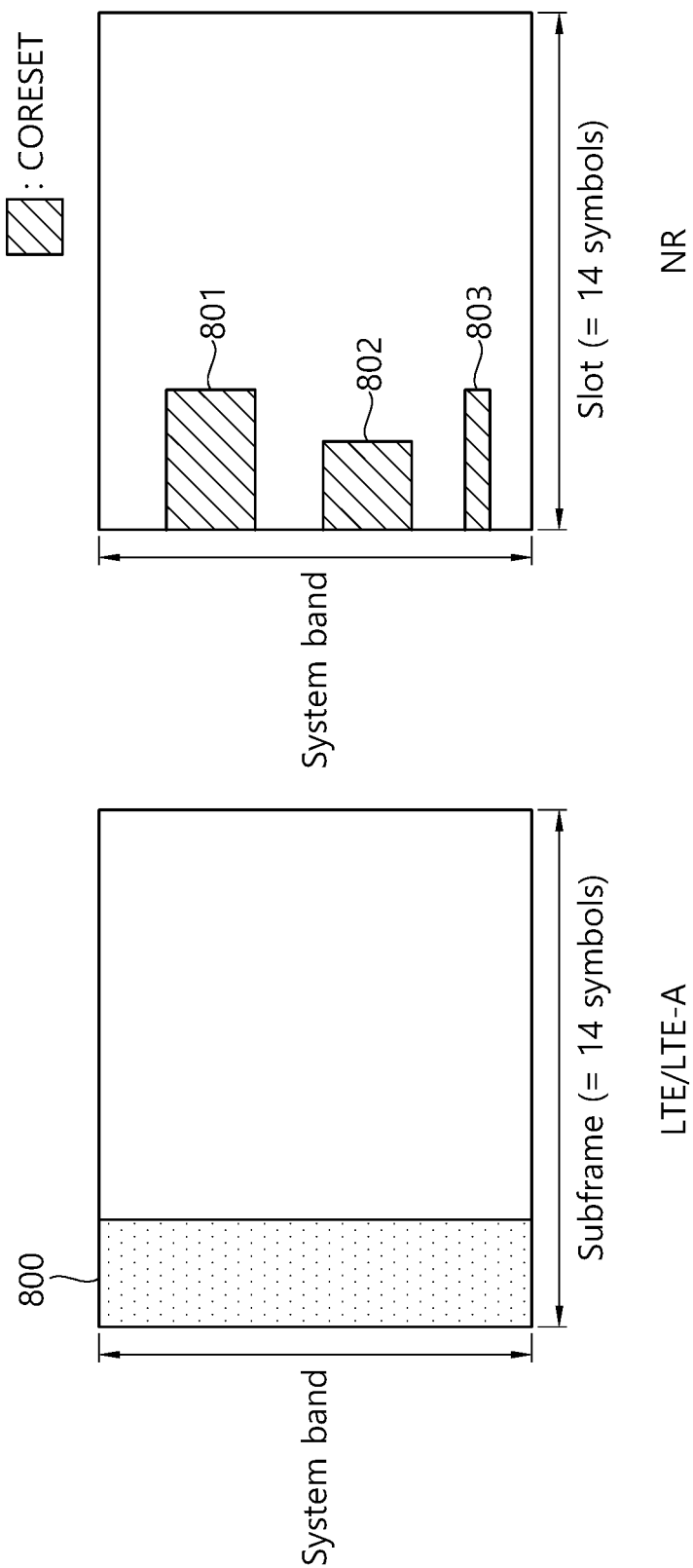
FIG. 8 is a diagram illustrating a difference between a related art control region and the CORESET in NR.

FIG. 8 is a diagram illustrating a difference between a related art control region and the CORESET in NR.

Referring to FIG. 8, a control region 800 in the related art wireless communication system (e.g., LTE/LTE-A) is configured over the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

On the other hand, in NR, CORESET described above was introduced. CORESETs 801, 802, and 803 are radio resources for control information to be received by the terminal and may use only a portion, rather than the entirety of the system bandwidth. The BS may allocate the CORESET to each UE and may transmit control information through the allocated CORESET. For example, in FIG. 8, a first CORESET 801 may be allocated to UE 1, a second CORESET 802 may be allocated to UE 2, and a third CORESET 803 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.

<Self-Contained Subframe Structure>

Figure 9:
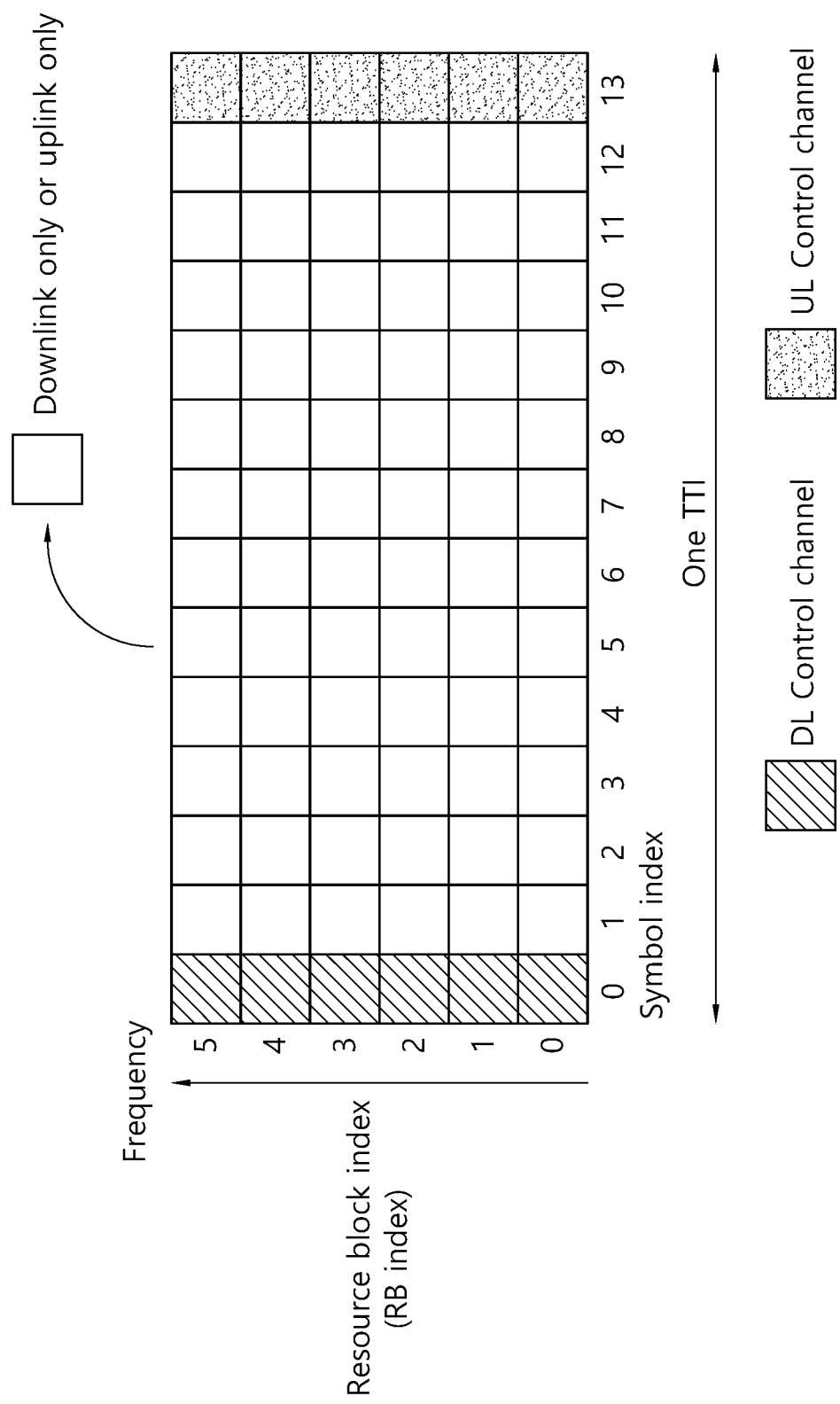
FIG. 9 illustrates an example of a frame structure for new radio access technology.

FIG. 9 illustrates an example of a frame structure for new radio access technology.

In NR, a structure in which a control channel and a data channel are time-division-multiplexed within one TTI, as shown in FIG. 9, can be considered as a frame structure in order to minimize latency.

In FIG. 9, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a terminal to switch from a transmission mode to a reception mode or from the reception mode to the transmission mode may be required. To this end, some OFDM symbols at a time when DL switches to UL may be set to a guard period (GP) in the self-contained subframe structure.

In other words, the frame structure of the NR may be a self-contained structure in which all of a DL control channel, a DL or UL data channel, and a UL control channel may be included in one TTI (e.g., slot) unit as illustrated in FIG. 9. Here, DL data scheduling information and UL data scheduling information may be transmitted in the DL control channel, and ACK/NACK information for DL data, CSI information (modulation and coding scheme information, MIMO transmission related information, etc.), a scheduling request (SR), and the like may be transmitted in the UL control channel. In FIG. 9, a timing gap for DL-to-UL or UL-to-DL switching may exist between the control region and the data region. In addition, some of the DL control channel/DL data channel/UL data channel/UL control channel may not be configured in one slot. Alternatively, order of channels configuring one slot may vary. For example, order of channels may be configured such as a DL control channel/DL data channel/UL control channel/UL data channel or a UL control channel/UL data channel/DL control channel/DL data channel.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effieicntness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

Figure 10:
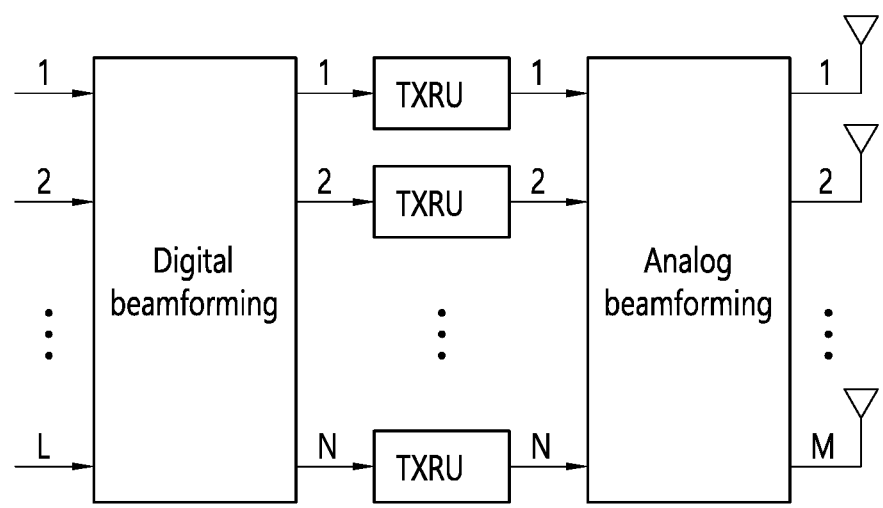
FIG. 10 is an abstract schematic diagram illustrating hybrid beamforming from the viewpoint of TXRUs and physical antennas.

FIG. 10 is an abstract schematic diagram illustrating hybrid beamforming from the viewpoint of TXRUs and physical antennas.

In FIG. 10, the number of digital beams is L and the number of analog beams is N. Further, in the NR system, by designing the base station to change the analog beamforming in units of symbols, it is considered to support more effieicnt beamforming for a terminal located in a specific area. Furthermore, when defining N TXRUs and M RF antennas as one antenna panel in FIG. 7, it is considered to introduce a plurality of antenna panels to which independent hybrid beamforming is applicable in the NR system.

When a base station uses a plurality of analog beams as described above, analog beams suitable to receive signals may be different for terminals and thus a beam sweeping operation of sweeping a plurality of analog beams to be applied by a base station per symbol in a specific subframe (SF) for at least a synchronization signal, system information and paging such that all terminals can have reception opportunities is considered.

Figure 11:
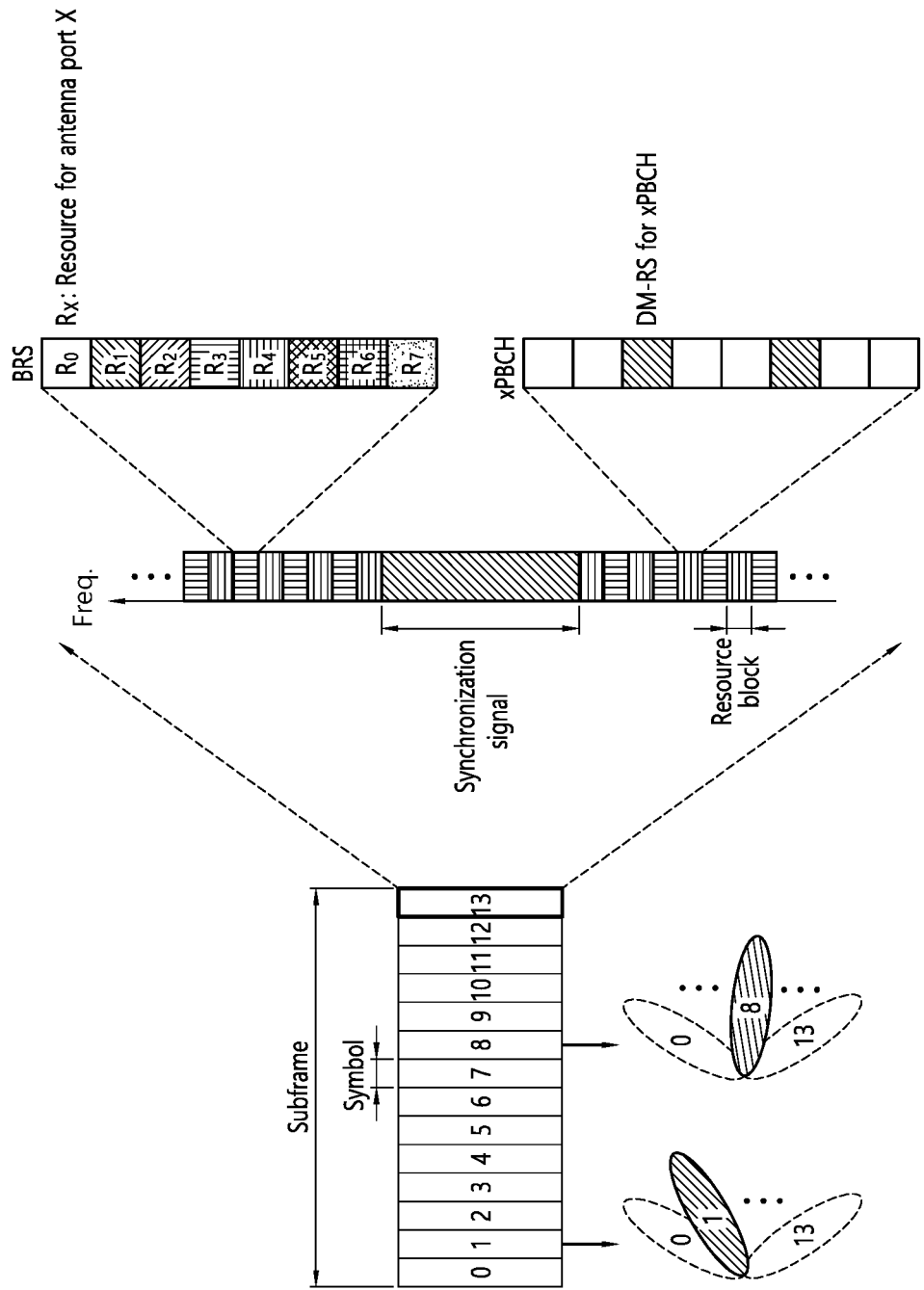
FIG. 11 illustrates the beam sweeping operation for a synchronization signal and system information in a downlink (DL) transmission procedure.

FIG. 11 illustrates the beam sweeping operation for a synchronization signal and system information in a downlink (DL) transmission procedure.

In FIG. 11, physical resources (or a physical channel) in which system information of the NR system is transmitted in a broadcasting manner is referred to as a physical broadcast channel (xPBCH). Here, analog beams belonging to different antenna panels can be simultaneously transmitted within one symbol, and a method of introducing a beam reference signal (BRS) which is a reference signal (RS) to which a single analog beam (corresponding to a specific antenna panel) is applied in order to measure a channel per analog beam, as illustrated in FIG. 8, is under discussion. The BRS can be defined for a plurality of antenna ports, and each antenna port of the BRS can correspond to a single analog beam. Here, all analog beams in an analog beam group are applied to the synchronization signal or xPBCH and then the synchronization signal or xPBCH is transmitted such that an arbitrary terminal can successively receive the synchronization signal or xPBCH.

<Bandwidth Part (BWP)>

In the NR system, a maximum of 400 MHz can be supported per component carrier (CC). If a UE operating in such a wideband CC operates with RF for all CCs turn on all the time, UE battery consumption may increase. Otherwise, considering use cases operating in one wideband CC (e.g., eMBB, URLLC, mMTC, etc.), different numerologies (e.g., subcarrier spacings (SCSs)) can be supported for different frequency bands in the CC. Otherwise, UEs may have different capabilities for a maximum bandwidth. In consideration of this, an eNB may instruct a UE to operate only in a part of the entire bandwidth of a wideband CC, and the part of the bandwidth is defined as a bandwidth part (BWP) for convenience. A BWP can be composed of resource blocks (RBs) consecutive on the frequency axis and can correspond to one numerology (e.g., a subcarrier spacing, a cyclic prefix (CP) length, a slot/mini-slot duration, or the like).

Further, the eNB can configure a plurality of BWPs for a UE even within one CC. For example, a BWP occupying a relatively small frequency domain can be set in a PDCCH monitoring slot and a PDSCH indicated by a PDCCH can be scheduled on a BWP wider than the BWP. When UEs converge on a specific BWP, some UEs may be set to other BWPs for load balancing. Otherwise, BWPs on both sides of a bandwidth other than some spectra at the center of the bandwidth may be configured in the same slot in consideration of frequency domain inter-cell interference cancellation between neighbor cells. That is, the eNB can configure at least one DL/UL BWP for a UE associated with (=related with) a wideband CC and activate at least one of DL/UL BWPs configured at a specific time (through L1 signaling or MAC CE or RRC signaling), and switching to other configured DL/UL BWPs may be indicated (through L1 signaling or MAC CE or RRC signaling) or switching to a determined DL/UL BWP may occur when a timer value expires on the basis of a timer. Here, an activated DL/UL BWP is defined as an active DL/UL BWP. However, a UE may not receive a configuration for a DL/UL BWP when the UE is in an initial access procedure or RRC connection is not set up. In such a situation, a DL/UL BWP assumed by the UE is defined as an initial active DL/UL BWP.

Hereinafter, a channel access procedure (CAP) will be described. The channel access procedure may also be referred to as a listen before talk (LBT) procedure.

First, a downlink channel access procedure will be described.

An eNB operating with LAA SCell(s) needs to perform the following channel access procedure to access channels on which transmission(s) of LSS SCell(s) are performed.

Hereinafter, a channel access procedure for transmission(s) including a PDSCH/PDCCH/EPDCCH will be described.

When a channel in an idle state is sensed first for a slot duration of a defer duration Td and a counter N is 0 in step 4, the eNB can perform transmission including PDSCH/PDCCH/EPDCCH on a carrier on which transmission(s) of LAA SCell(s) are performed. The counter N is adjusted by sensing a channel additional slot duration(s) according to the steps below.

1) N is set to $N=N_{init}$. Here, N is an arbitrary number uniformly distributed between 0 and $CW_p$. Then, the procedure proceeds to step 4.

2) If N>0 and the eNB selects decreasing of the counter, N=N−1 is set.

3) When a channel with respect to an additional slot duration is sensed and the additional slot duration is idle, the procedure proceeds to step 4. If not, the procedure proceeds to step 5.

4) The procedure ends if N=0 and proceeds to step 2 if not.

5) The channel is sensed until a busy slot is detected within the additional defer duration $T_d$ or all slots of the additional defer duration $T_d$ are sensed as being idle.

6) If it is sensed that the channel is idle in all slot durations of the additional defer duration $T_d$, the procedure proceeds to step 4. If not, the procedure proceeds to step 5.

When the eNB has not perform transmission including PDSCH/PDCCH/EPDCCH on a carrier on which transmission(s) of LAA SCell(s) are performed after step 4 of the procedure, if the eNB is ready to transmit the PDSCH/PDCCH/EPDCCH, the eNB can perform transmission including PDSCH/PDCCH/EPDCCH on the carrier when it is sensed that the channel is idle in at least a slot duration $T_{sl}$ and the channel is idle in all slot durations of the defer duration $T_d$ immediately before the transmission. When the eNB senses that the channel is not idle in the slot duration $T_{sl}$ or senses that the channel is not idle in arbitrary slot durations of the defer duration $T_d$ immediately before intended transmission when the eNB initially senses the channel after the eNB is ready to perform transmission, the eNB senses that the channel is idle in slot durations of the defer duration $T_d$ and then proceeds to step 1.

The defer duration $T_d$ is configured as a duration of $T_f$=16 μs immediately after consecutive slot durations $m_p$. Here, each slot duration is $T_{sl}$=9 μs and $T_f$ includes an idle slot duration $T_{sl}$ at the start point of $T_f$.

The slot duration $T_{sl}$ is considered to be idle (that is, available) if the eNB senses the channel in the slot duration and power detected by the eNB for at least 4 μs within the slot duration is less than an energy detection threshold $X_{Thresh}$. If not, the slot duration $T_{sl}$ is considered to be busy (unavailable).

$CW_p$ ($CW_{min,p} \leq CW_p \leq CW_{max,p}$) is a contention window. Adjustment of $CW_p$ will be described in a contention window adjustment procedure.

$CW_{min,p}$ and $CW_{max,p}$ are selected before step 1 of the above-described procedure.

As shown in Table 4, $m_p$, $CW_{min,p}$ and $CW_{max,p}$ are based on a channel access priority class associated with NB transmission.

If N>0 in the aforementioned procedure, when the eNB transmits a discovery signal that does not include a PDSCH/PDCCH/EPDCCH, the eNB should not reduce N in slot duration(s) overlapping with discovery signal transmission.

The eNB should not perform continuous transmission on a carrier on which transmission(s) of LAA SCell(s) are performed for a duration that exceeds $T_{mcot,p}$ given in Table 4.

If absence of other technologies sharing carriers can be ensured in the long term (for example, according to a level of regulation) for p=3 and p=4, $T_{mcot,p}$=10 ms. If not, $T_{mcot,p}$=8 MS.

Table 4 shows a channel access priority class.

TABLE 4

| Channel access priority class (p) | $m_p$ | $CW_{min,p}$ | $CW_{max,p}$ | $T_{mcot,p}$ | Permitted $CW_p$ size |
|---|---|---|---|---|---|
| 1 | 1 | 3 | 7 | 2 ms | {3, 7} |
| 2 | 1 | 7 | 15 | 3 ms | {7, 15} |

TABLE 4-continued

| Channel access priority class (p) | $m_p$ | $CW_{min,p}$ | $CW_{max,p}$ | $T_{mcot,p}$ | Permitted $CW_p$ size |
|---|---|---|---|---|---|
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

Hereinafter, a channel access procedure for transmissions including discovery signal transmission(s) without a PDSCH will be described.

An eNB can transmit a discovery signal without a PDSCH on a carrier on which transmission(s) of LAA SCell(s) are performed if a transmission duration is less than 1 ms immediately after sensing that a channel is idle for at least a sensing interval of $T_{drs}=25$ μs. $T_{drs}$ is configured as $T_f=16$ μs immediately after one slot duration $T_{sl}=9$ μs and $T_f$ includes the idle slot duration $T_{sl}$ at the start point of $T_f$. If it is sensed that the channel is idle for slot durations of $T_{drs}$, the channel is considered to be idle for $T_{drs}$.

Hereinafter, a contention window adjustment procedure will be described.

If an eNB performs transmissions including a PDSCH associated with a channel access priority class p on a carrier, the eNB maintains a contention window value $CW_p$ and adjusts $CW_p$ for transmissions using the following steps prior to step 1 of the above-described procedure.

1) For all priority classes p∈{1, 2, 3, 4}, $CW_p=CW_{min,p}$ is set.

2) If at least Z=80% of HARQ-ACK values corresponding to PDSCH transmission(s) is determined to be NACK in a reference subframe k, the procedure increases $CW_p$ to a next highest permitted value for all priority classes p∈{1, 2, 3, 4} and remains in step 2. If not, the procedure proceeds to step 1.

The reference subframe k is a subframe in which most recent transmission performed by an eNB on a carrier expected to be available for at least some HARQ-ACK feedbacks starts.

The eNB needs to adjust the value of $CW_p$ for all priority classes p∈{1, 2, 3, 4} only once on the basis of the given reference subframe k.

If $CW_p=CW_{max,p}$, the next highest permitted value $CW_{max,p}$ for $CW_p$ adjustment.

When Z is determined,
- If eNB transmission(s) available for HARQ-ACK feedback start at the second slot of the subframe k, HARQ-ACK values corresponding to PDSCH transmission(s) in a subframe k+1 can also be used by being added to HARQ-ACK values corresponding to PDSCH transmission(s) in the subframe k.
- If HARQ-ACK values correspond to PDSCH transmission(s) on an LAA SCell allocated according to an (E)PDCCH transmitted on the same LAA SCell,
  if the eNB has not detected HARQ-ACK feedback for PDSCH transmission or the eNB detects "DTX", "NACK/DTX" or "any" state, it is computed as NACK.
- If HARQ-ACK values correspond to PDSCH transmission(s) on an LAA SCell allocated according to an (E)PDCCH transmitted on another serving cell,
  if HARQ-ACK feedback for PDSCH transmission is detected by the eNB, "NACK/DTX" or "any" state is computed as NACK and "DTX" state is ignored.
- If HARQ-ACK feedback for PDSCH transmission is not detected by the eNB,
  if PUCCH format 1b using channel selection is expected to be used by a UE, "NACK/DTX" state corresponding to "no transmission" is computed as NACK and "DTX" state corresponding to "no transmission" is ignored. If not, HARQ-ACK for PDSCH transmission is ignored.
- If PDSCH transmission has two codewords, a HARQ-ACK value of each codeword is separately considered.
- Bundled HARQ-ACK over M subframes is considered as M HARQ-ACK responses.

If the eNB performs transmission that includes a PDCCH/EPDCCH having DCI format 0A/0B/4A/4B and does not include a PDSCH associated with channel access priority class p on a channel starting at a time to, the eNB maintains the contention window value $CW_p$ and, adjusts $CW_p$ for transmissions using the following steps prior to step 1 of the above-described procedure.

1) For all priority classes p∈{1, 2, 3, 4}, $CW_p=CW_{min,p}$ is set.

2) When 10% or less of UL transport blocks scheduled by the eNB has been successfully received using type-2 channel access procedure within an interval from to $t_0$ $t_0+T_{CO}$, the procedure increases $CW_p$ to a next highest permitted value for all priority classes p∈{1, 2, 3, 4} and remains in step 2. If not, the procedure proceeds to step 1.

If $CW_p=CW_{max,p}$ is consecutively used K times for generation of $N_{init}$, $CW_p$ is reset to $CW_{min,p}$ only for a priority class p at which $CW_p=CW_{max,p}$ is consecutively used K times for generation of $N_{init}$. K is selected by the eNB from a set of values of {1, 2, . . . , 8} for each of priority classes p∈{1, 2, 3, 4}.

Hereinafter, an energy detection threshold adaptation procedure will be described.

An eNB which is accessing a carrier on which transmission(s) of LAA SCell(s) are performed needs to set the energy detection threshold $X_{Thresh}$ to be equal to or less than a maximum energy detection threshold $X_{Thresh\_max}$.

$X_{Thresh\_max}$ is determined as described later.
- If absence of other technologies sharing carriers can be ensured in the long term (for example, according to a level of regulation),
  $X_{Thresh\_max}=\min\{T_{max}+10$ dB, $X_r\}$.
  Xr is a maximum energy detection threshold defined in dB according to regulatory requirements when the regulatory requirements are defined. If not, $X_r=T_{max}+10$ dB.
- If not,
  $X_{Thresh\_max}=\max\{-72+10*\log 10(BWMHz/20$ Mhz) dBm, $\min\{T_{max}, T_{max}-T_A+(P_H+10*\log 10(BWMHz/20$ MHz$)-P_{TX})\}\}$.

Here,
- $T_A=10$ dB for transmission(s) including a PDSCH.
- $T_A=5$ dB for transmissions including discovery signal transmission(s) without a PDSCH.
- $P_H=23$ dBm.
- PTX is the set maximum eNB output power in dBm with respect to a carrier.
- An eNB uses the maximum transmission power set with respect to a single carrier irrespective of whether a single carrier transmission or multi-carrier transmission is used.
- $T_{max}(dBm)=10*\log 10(3.16228*10^{-8}(mW/MHz)*BWMHz(MHz))$.
- BWMHz is a single carrier bandwidth in MHz.

Hereinafter, a channel access procedure for transmission(s) on a plurality of carriers.

An eNB can access a plurality of carriers on which transmission(s) of LAA SCells are performed according to one of type-A and type-B procedures described later.

Hereinafter, a type-A mult-carrier access procedure will be described.

An eNB needs to perform channel access on each carrier $c_i \in C$ according to the aforementioned channel access procedure for transmission(s) including a PDSCH/PDCCH/EPDCCH. Here, C is a set of carriers intended to be transmitted by the eNB, i=0, 1, . . . , q−1, and q is the number of carriers intended to be transmitted by the eNB.

The counter N described in the aforementioned channel access procedure for transmission(s) including a DSCH/PDCCH/EPDCCH is determined for each carrier $c_i(c\_i)$ and represented as $N_{c\_i}$. $N_{c\_i}$ is maintained in type A1 or type A2.

Hereinafter, type A1 will be described.

The counter N described in the aforementioned channel access procedure for transmission(s) including a DSCH/PDCCH/EPDCCH is determined for each carrier $c_i$ and represented as $N_{c\_i}$.

If absence of other technologies sharing carriers is not ensured in the long term (for example, according to a level of regulation), when the eNB stops transmission on any one carrier $c_j \in C$, the eNB can resume $N_{c\_i}$ reduction for each carrier $c_i \neq c_j$ after idle slots are sensed after waiting for a duration of $4T_{sl}$ or after $N_{c\_i}$ is reinitialized.

Hereinafter, type A2 will be described.

The counter N described in the aforementioned channel access procedure for transmission(s) including a DSCH/PDCCH/EPDCCH is determined for a carrier $c_j \in C$ and represented as $N_{c\_i}$. Here, $c_j$ is a carrier having a largest $CW_p$ value. For each carrier $N_{c\_i} = N_{c\_i}$. When the eNB stops transmission on any one carrier for which $N_{c\_i}$ has been determined, the eNB needs to reinitialize $N_{c\_i}$ for all carriers.

Hereinafter, a type-B multi-carrier access procedure will be described.

A carrier $c_j \in C$ is selected by an eNB as follows.

The eNB uniformly randomly selects $c_j$ from C prior to respective transmissions on a plurality of carriers $c_i \in C$, or the eNB does not select $c_j$ more than once per second.

Here, C is a set of carriers intended to be transmitted by the eNB, i is 0, 1, . . . , q−1, and q is the number of carriers intended to be transmitted by the eNB.

For transmission on a carrier $c_j$, the eNB needs to perform channel access on a carrier $c_j$ according to the aforementioned channel access procedure including a PDSCH/PDCCH/EPDCCH having a modification for type B1 or type B described below.

For transmission on a carrier corresponding to $c_i \in C$ and $c_i \neq c_j$, for each carrier $c_i$, the eNB needs to sense the carrier ci for at least the sensing interval $T_{mc} = 25$ μs immediately before transmission on the carrier $c_j$ and the eNB can perform transmission on the carrier ci immediately after sensing that the carrier $c_i$ is idle for at least the sensing interval $T_{mc}$. The carrier ci is considered to be idle for $T_{mc}$ if it is sensed that a channel is idle for all time intervals in which idle sensing is performed on the carrier $c_j$ within the given interval $T_{mc}$.

The eNB should not continuously perform transmission on a carrier corresponding to $c_i \in C$, $c_i \neq c_j$ for a period that exceeds $T_{mcot,p}$ given in Table 4. Here, the value of $T_{mcot,p}$ is determined using a channel access parameter used for carriers $c_j$.

Hereinafter, type B1 will be described.

A single $CW_p$ value is maintained for a set C of carriers.

When $CW_p$ is determined for channel access on a carrier $c_j$, step 2 described in the contention window adjustment procedure is modified as follows.

If at least Z=80% of HARQ-ACK values corresponding to PDSCH transmission(s) in reference subframes k of all carriers $c_i \in C$ is determined to be NACK, the procedure increases $CW_p$ to a next highest permitted value for respective priority classes $p \in \{1, 2, 3, 4\}$. If not, the procedure proceeds to step 1.

Hereinafter, type B2 will be described.

$CW_p$ is independently maintained for each carrier $c_i \in C$ using the aforementioned contention window adjustment procedure.

When $N_{init}$ is determined for carriers $c_j$, the value of $CW_p$ of a carrier $c_{j1} \in C$ is used. Here, $c_{j1}$ is a carrier having a largest $CW_p$ value among all carriers in the set C.

Hereinafter, an uplink channel access procedure will be described.

A UE and an eNB which schedules uplink transmission(s) for the UE need to perform the following procedures to access channel(s) on which transmission(s) of LAA SCell(s) are performed for the UE.

Hereinafter, a channel access procedure for uplink transmission(s) will be described.

A UE can access a carrier on which uplink transmission(s) of LAA SCell(s) are performed according to one of type-1 and type-2 uplink channel access procedures.

If an uplink grant that schedules PUSCH transmission indicates the type-1 channel access procedure, the UE needs to use the type-1 channel access procedure in order to perform transmissions including PUSCH transmission unless otherwise described.

If the uplink grant that schedules PUSCH transmission indicates the type-2 channel access procedure, the UE needs to use the type-2 channel access procedure in order to perform transmissions including PUSCH transmission unless otherwise described.

The UE needs to use the type-1 channel access procedure when the UE performs SRS transmissions including no PUSCH transmission. An uplink channel access priority class p=1 is used for SRS transmissions including no PUSCH.

Table 5 shows a channel access priority class for uplink.

TABLE 5

| Channel access priority class (p) | $m_p$ | $CW_{min,p}$ | $CW_{max,p}$ | $T_{ulmcot,p}$ | Permitted $CW_p$ value |
|---|---|---|---|---|---|
| 1 | 2 | 3 | 7 | 2 ms | {3, 7} |
| 2 | 2 | 7 | 15 | 3 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

Note 1:
$T_{ulmcot,p}$ = 10 ms if higher layer parameter 'absenceOfAnyOtherTechnology-r14' indicates TRUE for p = 3, 4 and $T_{ulmcot,p}$ = 6 ms if not.
Note 2:
When $T_{ulmcot,p}$ = 6 ms, this can be increased to 8 ms by inserting one or more gaps. A minimum gap duration must be 100 μs. A maximum duration before insertion of any gap must be 6 ms.

When "UL configuration for LAA" field configures "UL offset" 1 and "UL duration" d for a subframe n, if end of UE transmission occurs within or before a subframe n+1+d−1, the UE can use channel access type 2 for transmissions within a subframe n+1+i irrespective of channel access type signaled by an uplink grant for such subframes, and i=0, 1, ..., d−1.

When the UE has scheduled transmissions including a PUSCH in a set of subframes $n_0, n_1, \ldots, n_{w-1}$ using PDCCH DCI format 0B/4B and has not accessed a channel for transmission in a subframe $n_k$, the UE needs to attempt transmission in a subframe $n_{k+1}$ according to a channel access type indicated in DCI. Here, $k \in \{0, 1, \ldots, w-2\}$ and w is the number of scheduled subframes indicated in the DCI.

If the UE is scheduled to perform transmissions which do not have gaps including a PUSCH in the set of subframes $n_0$, $n_1, \ldots, n_{w-1}$ using one or more PDCCH DCI formats 0A/0B/4A/4B and performs transmission in a subframe $n_k$ after accessing a carrier according to one of the type-1 and type-2 uplink channel access procedures, the UE can continue transmission in subframes after $n_k$. Here, $k \in \{0, 1, \ldots, w-1\}$.

If the start of UE transmission in a subframe n+1 is immediately after the end of UE transmission in a subframe n, the UE does not expect indication of different channel access types for transmissions in such subframes.

When the UE is scheduled to perform transmission without a gap in subframes $n_0, n_1, \ldots, n_{w-1}$ using one or more PDCCH DCI formats 0A/0B/4A/4B, has stopped transmission for or before a subframe $n_{k1}$ for which $k1 \in \{0, 1, \ldots, w-2\}$, and senses that a channel is continuously idle after transmission has been stopped, the UE can perform transmission in the following subframe $n_{k2}$ for which $k2 \in \{1, \ldots, w-1\}$ using the type-2 channel access procedure. If the channel sensed by the UE is not continuously idle after the UE stops transmission, the UE can perform transmission in the following subframe $n_{k2}$ for which $k2 \in \{1, \ldots, w-1\}$ using a type-1 channel access procedure having an uplink channel access priority class indicated in DCI corresponding to the subframe $n_{k2}$.

If the UE receives a UL grant, DCI indicates PUSCH transmission which starts in a subframe n using a type-1 channel access procedure and the UE has an ongoing type-1 channel access procedure before the subframe n, If an uplink channel access priority class value $p_1$ used for the continuous type-1 channel access procedure is equal to or greater than an uplink channel access priority class value $p_2$ indicated by DCI, the UE can perform PUSCH transmission in response to the UL grant by accessing a carrier using the continuous type-1 channel access procedure.

If the uplink channel access priority class value $p_1$ used for the continuous type-1 channel access procedure is less than the uplink channel access priority class value $p_2$ indicated by the DCI, the UE needs to end the continuous channel access procedure.

If the UE is scheduled to perform transmission on the set C of carriers in the subframe n, UL grants which schedule PUSCH transmissions on the set C of carriers indicate the type-1 channel access procedure, the same "PUSCH starting position" is indicated by all carriers in the set C of carriers, and carrier frequencies of the set C of carriers are a subset of predefined sets of carrier frequencies, the UE can perform transmission on a carrier $c_i \in C$ using the type-2 channel access procedure in the following case.

If the type-2 channel access procedure is performed on the carrier ci immediately before UE transmission on a carrier corresponding to $c_i \in C$, i≠j and when the UE has accessed a carrier $c_j$ using the type-1 channel access procedure, here, the carrier $c_j$ is uniformly randomly selected by the UE from the set C of carriers before the type-1 channel access procedure is performed on any carrier in the set C of carriers.

When an eNB has performed transmission on a carrier according to a channel access procedure for transmission(s) including a PDSCH/PDCCH/EPDCCH, the eNB can indicate the type-2 channel access procedure in DCI of a UL grant which schedules transmission(s) including a PUSCH on a carrier in the subframe n. Alternatively, when the eNB has performed transmission on a carrier according to the channel access procedure for transmission(s) including a PDSCH/PDCCH/EPDCCH, the eNB can indicate that the type-2 channel access procedure for transmission(s) including a PUSCH on a carrier can be performed in the subframe n using "UL configuration for LAA" field. Alternatively, when the subframe n is generated within a time interval that starts at $t_0$ and ends at $t_0+T_{CO}$, the eNB can schedule transmissions including a PUSCH on a carrier in the subframe n, which follow transmission by the eNB on a carrier having a duration of $T_{short\_ul}=25$ µs. Here, $T_{CO}=T_{mcot,p}+T_g$, $t_0$ is a time instance at which an eNB starts transmission, the value of $T_{mcot,p}$ is determined by an eNB as described in the downlink channel access procedure, $T_g$ is a total time interval of gaps of all durations which exceed 25 µs generated between downlink transmission of an eNB and uplink transmission scheduled by the eNB and between arbitrary two uplink transmissions which start at $t_0$ and are scheduled by the eNB.

If continuous scheduling is possible, the eNB needs to schedule uplink transmissions between $t_0$ and $t_0+T_{CO}$ in consecutive subframes.

For uplink transmission on a carrier which follows transmission by the eNB on a carrier having a duration of $T_{short\_ul}=25$ µs, the UE can use the type-2 channel access procedure.

If the eNB indicates the type-2 channel access procedure for the UE in DCI, the eNB indicates a channel access priority class used to acquire access to a channel in the DCI.

Hereinafter, a type-1 uplink channel access procedure will be described.

The UE can perform transmission using the type-1 channel access procedure after sensing that a channel is idle first for a slot duration of a defer duration $T_d$ and after the counter N is 0 in step 4. The counter N is adjusted by sensing a channel with respect to additional slot duration(s) according to the following steps.

1) $N=N_{init}$ is set. Here, $N_{init}$ is an arbitrary number uniformly distributed between 0 and $CW_p$. Then, the procedure proceeds to step 4.

2) If N>0 and the eNB selects decrease of the counter, N=N−1 is set.

3) If a channel with respect to an additional slot duration is sensed and the additional slot duration is idle, the procedure proceeds to step 4. If not, the procedure proceeds to step 5.

4) The procedure ends if N=0 and proceeds to step 2 if not.

5) The channel is sensed until a busy slot is detected within an additional defer duration $T_d$ or it is sensed that all slots of the additional defer duration $T_d$ are idle.

6) If it is sensed that the channel is idle for all slot durations of the additional defer duration $T_d$, the procedure proceeds to step 4. If not, the procedure proceeds to step 5.

When the UE has not performed transmission including PUSCH transmission on a carrier on which transmission(s) of LAA SCell(s) are performed after step 4 of the above-described procedure, the UE can perform transmission including PUSCH transmission on the carrier if it is sensed that a channel is idle in at least the slot duration $T_{sl}$ when the UE is ready to perform transmission including PUSCH transmission and it is sensed that the channel is idle for all slot durations of the defer duration $T_d$ immediately before transmission including PUSCH transmission. If it is not sensed that the channel is idle in the slot duration $T_{sl}$ when the UE has initially sensed the channel after the UE is ready to perform transmission or it is not sensed that the channel is idle for arbitrary slot durations of the defer duration $T_d$ immediately before intended transmission including PUSCH transmission, the UE senses that the channel is idle for slot durations of the defer duration $T_d$ and then proceeds to step 1.

The defer duration $T_d$ is configured as a duration of $T_f=16$ μs immediately after consecutive slot durations $m_p$. Here, each slot duration is $T_{sl}=9$ μs and $T_f$ includes an idle slot duration $T_{sl}$ at the start point of $T_f$.

The slot duration $T_{sl}$ is considered to be idle if the UE senses the channel for the slot duration and power detected by the UE for at least 4 μs in the slot duration is less than the energy detection threshold $X_{Thresh}$. If not, the slot duration $T_{sl}$ is considered to be busy.

$CW_p$ ($CW_{min,p} \leq CW_p \leq CW_{max,p}$) is a contention window. Adjustment of $CW_p$ will be described in the contention window adjustment procedure.

$CW_{min,p}$ and $CW_{max,p}$ are selected before the aforementioned step 1.

$m_p$, $CW_{min,p}$ and $CW_{max,p}$ are based on a channel access priority class signaled to the UE as shown in Table 5.

$X_{Thresh}$ adaptation will be described in an energy detection threshold adaptation procedure which will be described later.

Hereinafter, a type-2 UL channel access procedure will be described.

If an uplink UE uses a type-2 channel access procedure for transmission including PUSCH transmission, the UE can perform transmission including PUSCH transmission immediately after sensing that a channel is idle for at least a sensing interval of $T_{short\_ul}=25$ μs. $T_{short\_ul}$ is configured as a duration of $T_f=16$ μs immediately followed by one shot duration of $T_{sl}=9$ μs, and $T_f$ includes an idle slot duration $T_{sl}$ at the start point of $T_f$. If a channel is sensed as being idle for slot durations of $T_{short\_ul}$, the channel is considered to be idle for $T_{short\_ul}$.

Hereinafter, the contention window adjustment procedure will be described.

If a UE performs transmission using the type-1 channel access procedure associated with a channel access priority class p on a carrier, the UE needs to maintain a contention window value $CW_p$ and adjust $CW_p$ for such transmissions before step 1 of the aforementioned type-1 uplink channel access procedure using the following procedures.

If an NDI value with respect to at least one HARQ procedure associated with HARQ_ID_ref is toggled, $CW_p=CW_{min,p}$ is set for all priority classes $p\in\{1, 2, 3, 4\}$.
 If not, $CW_p$ is increased to a next highest permitted value for all the priority classes $p\in\{1, 2, 3, 4\}$.
 HARQ_ID_ref is a HARQ process ID of UL-SCH in a reference subframe $n_{ref}$. The reference subframe $n_{ref}$ is determined as follows.
  When the UE has received an uplink grant in a subframe $n_g$, a subframe $n_w$ is a most recent subframe prior to a subframe $n_g-3$ in which the UE has transmitted UL-SCH using the type-1 channel access procedure.
  If the UE performs transmission which starts in a subframe $n_0$ without gaps and includes UL-SCH in subframes $n_0, n_1, \ldots, n_w$, the reference subframe $n_{ref}$ is the subframe no,
  If not, the reference subframe $n_{ref}$ is the subframe $n_w$.
 If the UE is scheduled to perform transmissions including PUSCH transmission without gaps in a set of subframes $n_0, n_1, \ldots, n_{w-1}$ using the type-1 channel access procedure and any transmission including PUSCH transmission cannot be performed in the set of subframes, the UE can maintain the value of $CW_p$ without changing the same for all priority classes $p\in\{1, 2, 3, 4\}$.
 If a reference subframe for finally scheduled transmission is also $n_{ref}$, the UE can maintain the value of $CW_p$ for all priority classes $p\in\{1, 2, 3, 4\}$ using the type-1 channel access procedure as in finally scheduled transmission including PUSCH transmission.
 If $CW_p=CW_{max,p}$, a next highest permitted value for $CW_p$ adjustment is $CW_{max,p}$.
 If $CW_p=CW_{max,p}$ is consecutively used K times for generation of $N_{init}$, $CW_p$ is reset to $CW_{min,p}$ only for a priority class p at which $CW_p=CW_{max,p}$ is consecutively used K times for generation of $N_{init}$. K is selected by the UE from a set of values of $\{1, 2, \ldots, 8\}$ for each of the priority classes $p\in\{1, 2, 3, 4\}$.

Hereinafter, energy detection threshold adaptation procedure.

A UE which has accessed a carrier on which transmission(s) of LAA SCell(s) are performed needs to set the energy detection threshold $X_{Thresh}$ to below a maximum energy detection threshold $X_{Tresh\_max}$.

$X_{Thresh\_max}$ is determined as follows.
 If the UE is configured by higher layer parameter "maxEnergyDetectionThreshold-r14",
  $X_{Thresh\_max}$ is set to the same value as a value signaled by the higher layer parameter.
 If not,
  the UE needs to determine $X'_{Thresh\_max}$ according to a default maximum energy detection threshold computation procedure which will be described later.
 If the UE is configured by higher layer parameter "energyDetectionThresholdOffset-r14",
  $X_{Thresh\_max}$ is set by applying $X'_{Thresh\_max}$ according to an offset value signaled by the higher layer parameter.
 If not,
  the UE needs to set $X_{Thresh\_max}=X'_{Thresh\_max}$.

Hereinafter, the default maximum energy detection threshold computation procedure will be described.

If higher layer parameter "absenceOfAnyOtherTechnology-r14" indicates "TRUE":
 $X'_{Thresh\_max}=\min\{T_{max}+10\text{ dB}, X_r\}$, here,
 $X_r$ is a maximum energy detection threshold defined in dBm according to regulatory requirements when the regulatory requirements are defined. If not $X_r=T_{max}+10$ dB.
If not,
 $X'_{Thresh\_max}=\max\{-72+10*\log\ 10(\text{BWMHz}/20\text{ MHz})\text{ dBm}, \min\{T_{max}, T_{max}-T_A+(P_H+10*\log\ 10(\text{BWMHz}/20\text{ MHz})-P_{TX})\}\}$
Here,
$T_A=10$ dB
$P_H=23$ dBm
$P_{TX}$ is set to $P_{CMAX\_H,c}$.
$T_{max}(\text{dBm})=10*\log\ 10(3.16228*10^{-8}(\text{mW/MHz})*\text{BWMHz(MHz)})$
BWMHz is a single carrier bandwidth in MHz.

The present disclosure proposes a method of configuring AUL UCI (uplink control information) according to a higher layer signal such as RRC and a MCOT (maximum channel occupancy time) sharing method when a UE transmits data to an eNB through autonomous uplink (AUL) transmission in a wireless communication system composed of the eNB and the UE in an unlicensed band.

As a larger number of communication devices requires larger communication capacity, efficient utilization of limited frequency bands in a next wireless communication system is increasingly required. In cellular communication systems such as LTE/NR systems, methods of using unlicensed bands such as 2.4 GHz mainly used in Wi-Fi system or unlicensed bands such as 5 GHz and 60 GHz which newly attract attention for traffic offloading are under discussion.

Since an unlicensed band is based on the assumption that wireless transmission and reception are performed through contention between communication nodes, it is necessary for each communication node to perform channel sensing before signal transmission to check whether another communication node has not transmitted a signal. This operation is called LBT (Listen before Talk) or a channel access procedure for convenience, and particularly, an operation of checking whether another communication node transmits a signal is defined as carrier sensing (CS) and a case in which it is determined that another communication does not transmit a signal is defined as confirmation of clear channel assessment (CCA).

Figure 12:
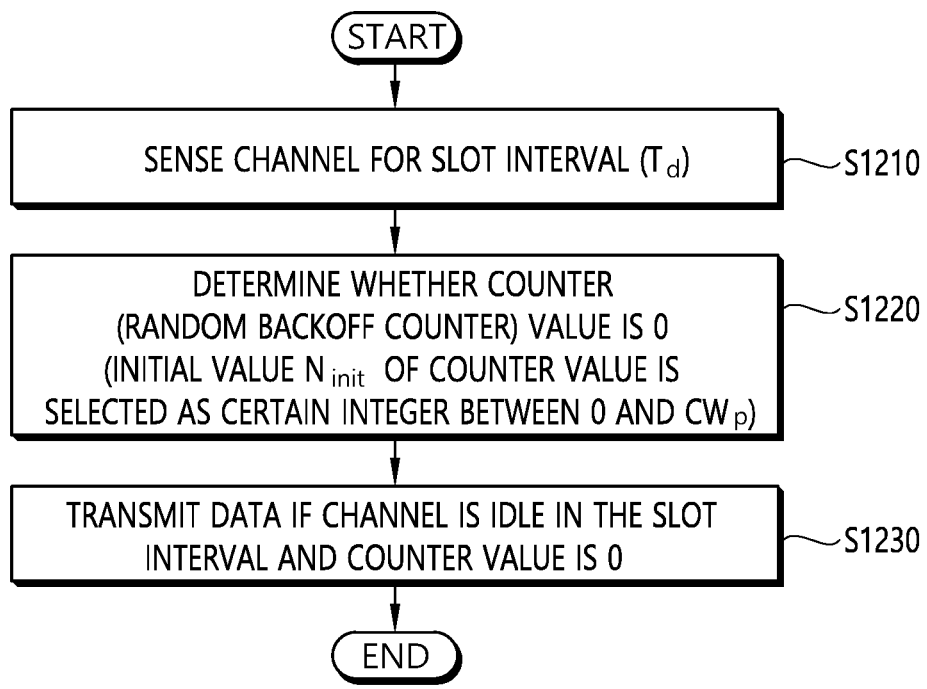
FIG. 12 illustrates a channel access procedure (or LBT).

FIG. 12 illustrates a channel access procedure (or LBT).

Referring to FIG. 12, a UE can perform channel sensing for a slot duration $T_d$ (S1210). The UE determines whether a counter (random back-off counter) value is 0 (S1220). An initial value $N_{init}$ of the counter value can be selected as any integer between 0 and $CW_p$. The UE can transmit data when a channel is idle in the slot duration and the counter value is 0 (S1230).

The procedure of FIG. 12 will be described in more detail. For example, channel sensing for initial channel access can be performed for at least $T_d$ (which may be referred to as a defer duration). If a channel is "idle (that is, available)" for the duration $T_d$ and the random back-off counter value N is 0, the channel is occupied to transmit data. Here, the following procedures can be performed as a procedure for adjusting N.

1) $N=N_{init}$ is set. Here, $N_{init}$ is any integer between 0 and $CW_p$;
2) if N is greater than 0, the UE selects reduction of N;
3) channel sensing is performed for one slot, procedure 4) is performed if a channel is "available" as a sensing result, and procedure 5) is performed if not;
4) the present procedure for channel access ends if N is 0 and procedure 2) is performed if not;
5) a channel is sensed until one slot is detected as "being used" in $T_d$ for additional duration $T_d$ or all slots are detected as "available" in the duration $T_d$;
6) procedure 4) is performed if the channel is sensed as "available" for all slots of the duration $T_d$ as a result of procedure 5) and procedure 5) is performed if not.

As defined in [Table 5] corresponding to a range for selecting $N_{init}$, a minimum value $CW_{min,p}$ and a maximum value $CW_{max,p}$ of $CW_p$ that is a current contention window size (CWS) are determined according to a channel access priority class p of data intended to be transmitted, and $CW_p$ has a value determined between the minimum value and the maximum value.

In the case of a UE which performs transmission on a certain carrier using the type-1 channel access procedure associated with a channel access priority class p, the UE can adjust a contention window size through the following process.

When the UE has received a UL grant or an AUL-DFI (downlink feedback indicator), if an NDI (new data indicator) field for a corresponding HARQ process is toggled or ACK is received for the corresponding HARQ process, the contention window size can be set to a minimum value for all priority classes. If not (for example, if the NDI field is not toggled or NACK is received for the corresponding HARQ process), the contention window size is increased to a next highest value among values permitted for priority classes in Table 5.

An eNB and a UE of an LTE/NR system need to perform LBT (channel access procedure) for signal transmission in an unlicensed band (hereinafter, which may also be referred to as U-band for convenience), and it may be necessary for other communication nodes such as Wi-Fi nodes not to perform LBT to cause interference when the eNB or the UE of the LTE/NR system transmits a signal. For example, a CCA threshold is defined as −62 dBm for non-Wi-Fi signals and as −82 dBm for Wi-Fi signals in Wi-Fi standard (801.11ac). This may mean that a communication node (a station (STA) or an access point (AP)) does not perform signal transmission such that interference does not occur when a signal other than Wi-Fi signals is received with power of −62 dBm or higher.

Now, the present disclosure will be described.

The present disclosure proposes a method of configuring (re)transmission of a code block group (CBG) and a method of configuring configured grant UL (CUL)-uplink control information (UCI) and CUL-downlink feedback information (DFI) at that time, when a UE performs CUL transmission in a wireless communication system including a BS and a UE in an unlicensed band.

As more and more communication devices require a larger communication capacity, the efficient use of a limited frequency band in a next wireless communication system is increasingly important. Cellular communication systems such as LTE/NR systems also consider a method of utilizing an unlicensed band such as the 2.4 GHz band mainly used by the existing WiFi system or unlicensed bands such as 5 GHz and 60 GHz bands that are receiving new attention for traffic offloading.

Basically, in the unlicensed band, it is assumed that wireless transmission/reception is performed through contention between communication nodes, so that each communication node is required to check that other communication nodes do not transmit signals by performing channel sensing, before transmitting a signal. For convenience, such an operation is called listen before talk (LBT) or a channel access procedure (CAP). In particular, an operation of checking whether another communication node transmits a signal may be referred to as carrier sensing (CS) and a case where it is determined that another communication node does not transmit a signal may be referred to as a confirmation of clear channel assessment (CCA).

A base station (BS) (or eNB) or a UE of the LTE/NR system should also perform LBT for signal transmission in the unlicensed band (hereinafter, may be referred to as U-band), and other communication nodes such as WiFi or the like should not cause interference by performing LBT when the BS or the UE of the LTE/NR system transmits a signal. For example, in the WiFi standard, a CCA threshold is defined as −62 dBm for non-WiFi signals and −82 dBm for WiFi signals. This means that a communication node (STA or AP) does not transmit a signal not to cause interference when a signal other than WiFi is received with power of −62 dBm or greater, for example.

In order to transmit uplink data of the UE in the unlicensed band, first, the BS should succeed in LBT for UL grant transmission on the unlicensed band and the UE should also succeed in LBT for UL data transmission. That is, UL data transmission may be attempted only when both LBTs of the BS and the UE succeed.

In addition, in the LTE system, it takes at least 4 msec between the UL grant and the UL data scheduled from the UL grant. During the corresponding time, another transmission node coexisting in the unlicensed band may access first, and in this case, the scheduled UL data transmission may be delayed. For this reason, autonomous UL transmission (AUL transmission) capable of transmitting UL data without a UL grant is considered as a method of increasing efficiency of UL data transmission in the unlicensed band.

The BS may inform the UE of an autonomous uplink (AUL) subframe or slot through an X bit bitmap (e.g., X=40 bits). When the UE is instructed to activate AUL transmission, it is possible to transmit uplink data without a UL grant in a subframe or slot indicated in the corresponding bitmap.

Just as the BS sends a PDCCH, which is scheduling information necessary for decoding when transmitting a PDSCH, to the UE, the UE may also transmit AUL UCI, which is information necessary for the BS to decode the corresponding PUSCH, when transmitting the PUSCH in AUL. The AUL-UCI may include information required for receiving an AUL PUSCH such as HARQ ID (identity), NDI (new date indicator), RV (redundant version), AUL SF (subframe) starting position, AUL SF ending position, and the like and information required for sharing UE-initiated channel occupancy time (COT) with a BS.

Sharing the UE-initiated COT with the BS specifically refers to an operation in which the UE transfers some of channels captured by the UE to the BS through a category 4 LBT (or type 1 channel access procedure) based on random-backoff and the BS transmits the PDCCH (and PDSCH) when a channel is idle through a 25 usec one shot LBT (using a timing gap prepared by the UE emptying a last symbol).

Meanwhile, a method of transmitting data of the UE in the unlicensed band may include granted uplink transmission (GUL) of transmitting data based on a dynamic UL grant and configured uplink transmission (CUL) of transmitting data without a dynamic UL grant. The CUL is a method in which the BS configures uplink resources for the UE in advance (via higher layer signals, etc.), and then when CUL is activated, the UE transmits data using the configured uplink resources without a dynamic UL grant. The CUL may also be used interchangeably with AUL.

Figure 13:
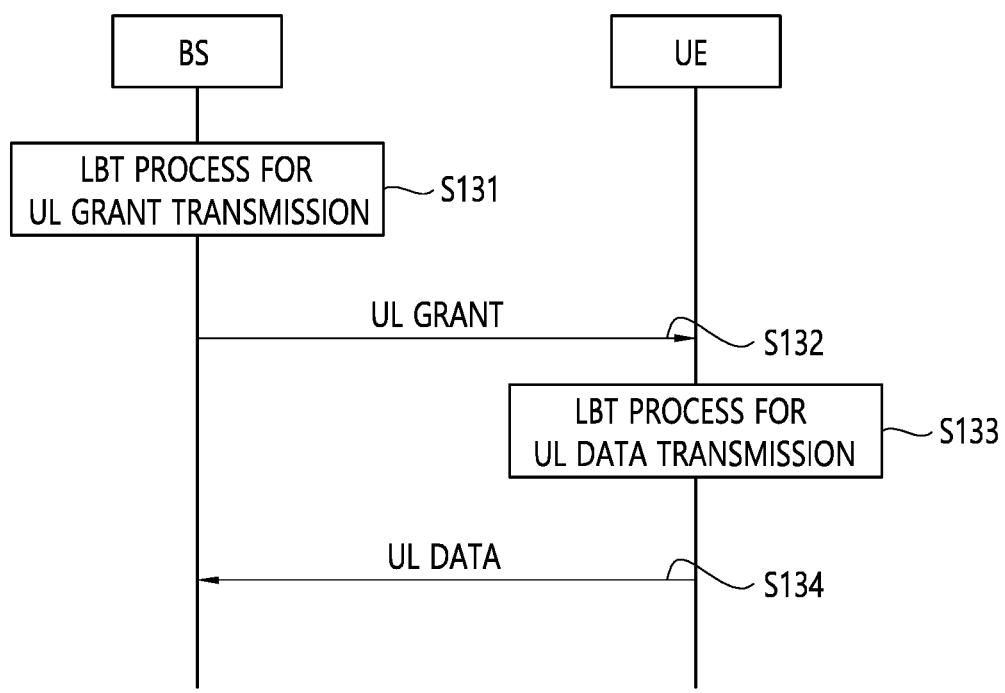
FIG. 13 illustrates a GUL operation between a BS and a UE in an unlicensed band.

FIG. 13 illustrates a GUL operation between a BS and a UE in an unlicensed band.

Referring to FIG. 13, the BS performs an LBT process (channel access procedure, which is the same hereinafter) for UL grant transmission (S131). If the LBT process is successful (e.g., when the BS determines that the channel may be used because another communication node does not use the channel), the BS transmits a UL grant to the UE (S132).

The UE performs an LBT process for UL data transmission (S133). If the LBT process is successful, the UE transmits UL data to the BS (S134). The UL data may be transmitted based on the UL grant. For example, the UL data may be transmitted using a resource scheduled from the UL grant.

As such, in order to transmit uplink data of the UE in the unlicensed band, first, the BS should succeed in LBT for UL grant transmission in the unlicensed band and the UE should also succeed in LBT for UL data transmission. That is, UL data transmission may be attempted only when both LBTs at the BS end and the UE end succeed.

In addition, in the LTE system, a delay of at least 4 msec is required between the UL grant and the UL data scheduled from the UL grant. During this delay time, if another transmission node coexisting in the unlicensed band accesses first, the scheduled UL data transmission may be delayed. For this reason, a method of increasing efficiency of UL data transmission in an unlicensed band is under discussion.

Figure 14:
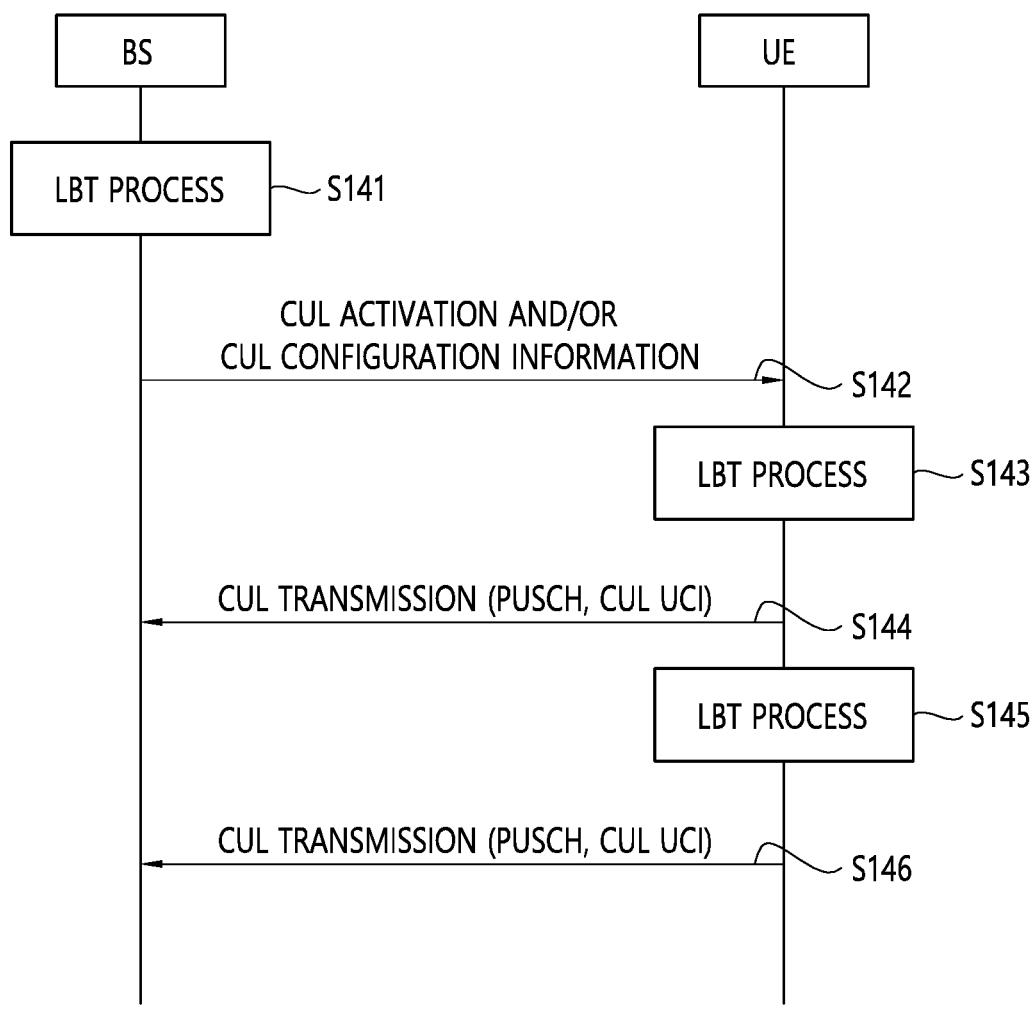
FIG. 14 illustrates a CUL operation between a BS and a UE in an unlicensed band.

FIG. 14 illustrates a CUL operation between a BS and a UE in an unlicensed band. CUL may refer to uplink transmission capable of transmitting UL data without a UL grant.

The BS may provide CUL activation and/or CUL configuration information to the UE through an LBT process (S141) (S142). The CUL configuration information may indicate, for example, a CUL subframe or a CUL slot capable of performing CUL. As an example, the CUL configuration information may include an X bit bitmap (e.g., X=40 bits) and may inform about a CUL subframe or a CUL slot through the bitmap.

When the UE is instructed to activate CUL, the UE may transmit uplink data without a UL grant in a CUL subframe or CUL slot indicated in the bitmap (S144, S146). However, it may be necessary to go through the LBT process before CUL transmission (S143, S145).

Meanwhile, as the BS transmits the PDCCH which is scheduling information required for decoding the PDSCH when transmitting the PDSCH to the UE, the UE may transmit a CUL UCI, which is information required for the BS to decode the corresponding PUSCH, together when transmitting the PUSCH in the CUL.

The CUL-UCI may include information required for receiving a CUL PUSCH such as HARQ ID (identity), NDI (new-data indicator), RV (redundancy version), AUL subframe (SF) starting position, AUL subframe ending position, information for sharing UE-initiated channel occupancy time (COT) with the BS, and the like.

Sharing the UE-initiated COT with the BS may refer to, for example, an operation in which the UE transfers some of channels captured by the UE to the BS through a category 4 LBT (or type 1 channel access procedure) based on random-backoff and the BS transmits the PDCCH (and PDSCH) when a channel is idle through a 25 usec one shot LBT (using a timing gap prepared by the UE emptying a last symbol).

Meanwhile, in the existing LTE, when a DL/UL transport block (TB) size is larger than a certain size, data (bit stream) to be transmitted is divided into several codeblocks (CBs), and channel coding and cyclic redundancy check (CRC) are added to each CB and transmitted through one PDSCH/PUSCH. The transmitted PDSCH (TB) is attempted to be decoded by the UE, and here, if even one of several CBs fails to be decoded, the UE transmits NACK for the corresponding PDSCH to the BS. Then, the BS retransmits an entire TB including the corresponding CB. That is, in the current LTE, the HARQ operation is a structure in which transmission and retransmission are performed in units of TB.

In NR (New RAT), a system bandwidth (BW) wider than LTE is considered, so it is highly likely that a size of one TB is relatively large, and thus the number of CBs configuring one TB may increase. Therefore, if the HARQ operation is performed in units of TB as in the existing LTE system, the entire TBs including the corresponding CB should be retransmitted even when NACK is reported as decoding of a small number of CBs fails, which is inefficient in terms of resource utilization.

In addition, in the NR system, an operation in which a delay-sensitive data type 2 (e.g., URLLC) having a relatively short TTI is transmitted in a puncturing form in some symbols of resources allocated for transmission of a delay-insensitive data type 1 (e.g., eMBB) having a relatively long TTI may be supported. A phenomenon in which decoding failure (i.e., NACK) is concentrated in some specific CBs among several CBs configuring one TB transmitted for data type 1 may occur due to the influence of such time-selective interference signals.

In consideration of the LTE AUL and NR CBG unit (re)transmission operation characteristics, a method of configuring configured grant UL transmission (CUL) of CBG unit in the NR unlicensed band (which may be referred to as NR-U hereinafter and a method of configuring information (CUL-UCI) required for the BS to decode the PUSCH transmitted from the UE in the CUL and CUL-DFI serving for the BS to feed back a PUSCH transmission result is proposed.

In addition, a method of configuring uplink transmission based on a received grant (granted UL transmission: GUL) and (re)transmission scheduling in a CBG unit of CUL and a configuring method of informing about initial TB transmission or retransmission in a CBG unit when configured by the method and informing about retransmission for which CBG of a TB by CUL-UCI and CUL-DFI in the case of retransmission are proposed.

In the case of CBG, all of the CBs (configuring a single TB) may be set as one CBG, some of a plurality of CBs may be configured as one CBG, or each of one CB may be configured as one CBG. Also, in the present disclosure, transmission in units of TB or retransmission (scheduling) in units of TB may refer to transmission or retransmission (scheduling) for all CBGs configuring the corresponding TB, and retransmission (scheduling) in units of CBG may refer to retransmission (scheduling) for some configuring the TB.

<Section 3.1: Method of Configuring CBG Unit (re)Transmission of CUL>

In the current NR, CBG unit (re)transmission may be set for each carrier in a semi-static manner through an higher layer signal (e.g., RRC signal), and when CBG unit (re)transmission is enabled, a TB transmitted through the PDSCH/PUSCH may be divided into CBG units and transmitted.

The UE/BS which has received the PDSCH/PUSCH in the CBG unit may feed back HARQ-ACK in the CBG unit to perform retransmission only for a CBG for which NACK is reported instead of the entire TB when some CBGs fail to decode. Therefore, when CBG unit (re)transmission is set, CBG unit HARQ-ACK feedback may be applied and it is necessary to inform about which CBG fails to decode and is retransmitted and which CBG succeeds in decoding to flush a buffer.

When a general grant-based uplink transmission is referred to as GUL, a method of configuring CBG unit (re)transmission of CUL in an NR unlicensed band is as follows.

[Proposed method #1] It is a method of separately configuring CBG unit (re)transmission for GUL and CUL.

In this method, CBG unit (re)transmission is configured separately for GUL and CUL. Therefore, when CBG unit (re)transmission is configured only for GUL, GUL may be (re)transmitted in units of CBG and CUL may be (re)transmitted in units of TB. Or, conversely, if CBG unit (re)transmission is not configured in GUL and CBG unit (re)transmission is configured only in CUL, GUL may be transmitted in units of TB and CUL may be (re)transmitted in units of CBG.

[Proposed method #2] It is a method of configuring CBG unit (re)transmission for each of GUL and CUL separately and configuring CBG unit (re)transmission of CUL only when GUL is configured for CBG unit (re)transmission.

In this method, if GUL is not set for CBG unit (re) transmission, CBG unit (re)transmission may not be configured for CUL and (re)transmission may be made only in units of TB, and only if CBG unit (re)transmission is configured for GUL, TB unit or CBG unit (re)transmission may be performed according to CBG unit (re)transmission configuration of CUL.

[Proposed method #3] It is a method of configuring CBG unit (re)transmission of CUL according to whether or not CBG unit (re)transmission for GUL is configured.

In this method, a transmission unit of CUL is determined according to a transmission unit of GUL. When GUL is TB unit (re)transmission, CUL is also (re)transmitted in units of TB and when CBG unit (re)transmission is configured for GUL, CUL is also (re)transmitted in units of CBG.

<Section 3.2: Method of Configuring CUL-DFI in Case of CBG Unit CUL Transmission>

A method of configuring HARQ-ACK information or the like in CUL-DFI when the BS feeds back a CBG unit PUSCH transmission result to the UE through CUL-DFI in a situation in which CBG unit (re)transmission is configured for CUL as one of the above-described methods in Section 3.1 will be described.

The BS may feed back the transmission result of AUL burst (i.e., HARQ-ACK) of the UE to the UE through AUL-DFI, and the UE may adjust a contention window size (CWS) based on the corresponding information. When a UL grant or AUL downlink feedback information (DFI) is received in an N-th subframe, a reference subframe (reference SF) serving as a reference for CWS adjustment may be a first subframe in N-4 or the last UL burst before N-4.

When the UE performs PUSCH transmission through a category 4 LBT (or type 1 channel access procedure) based on random-backoff, (1) in case where a UL grant is received, CWS adjustment of the UE is determined according to an NDI value of the HARQ ID (hereinafter referred to as HARQ_ID_ref) corresponding to the reference subframe associated with at least one HARQ process in the UL grant. For example, if the NDI value is toggled, it is regarded as new data and CW (hereinafter referred to as CWp, and p∈{1,2,3,4}) for each priority class is reset to a minimum CW (hereinafter referred to as CWmin,p) corresponding to the priority class, and if not, it is regarded that NACK has been fed back and CWp is adjusted to a one-step higher CW value corresponding to the priority class.

Meanwhile, (2) in case of receiving the AUL DFI, PUSCH transmission is performed without a UL grant, and thus HARQ-ACK feedback is received from the BS through the AUL DFI and the UE adjusts CWS according to a HARQ-ACK feedback result of HARQ_ID_ref in the corresponding AUL DFI. That is, if the feedback result of the HARQ process ID corresponding to the reference subframe is ACK, the CW is reset to $CW_{min,p}$, and if it is NACK, the CWp is adjusted to a one-step higher CW value corresponding to the priority class.

There is a HARQ-ACK bitmap field in the AUL DFI, and 1 bit may represent a HARQ-ACK result of each UL HARQ-process. The HARQ-ACK bitmap field may consist of a total of 16 bits in case of AUL transmission mode 1 (TM1) and 32 bits in case of AUL transmission mode 2 (AUL TM2).

In addition, the AUL DFI may additionally include HARQ-ACK feedback information for a HARQ process which is not set to AUL. If GUL is set to TM2 and AUL is set to TM1, HARQ-ACK corresponding to a HARQ process not set to AUL in AUL DFI may be spatially bundled and included.

Similarly, HARQ-ACK feedback information for all HARQ processes including GUL and CUL may be included in the CUL-DFI. HARQ-ACK information in the CUL-DFI may be configured to be different depending on TB unit (re)transmission or CBG unit (re)transmission of GUL and CUL.

[Proposed method #4] It is a method of configuring HARQ-ACK for GUL in CUL-DFI in units of TB and feeding back when CGB unit (re)transmission is configured for GUL.

In this method, when HARQ-ACK for GUL in the CUL-DFI is fed back in units of TB, single or multiple HARQ-ACK results for single or multiple CBGs configuring a TB transmitted in GUL are bundled as one ACK/NACK information and the ACK/NACK information in units of TB is included in the CUL-DFI.

In the bundling, if at least one CBG decoding result is successful and ACK, a decoding result for all TBs including the corresponding CBG may be regarded as ACK. If at least one CBG in one TB succeeds in decoding, a probability that another CBG that fails to decode is not a decoding failure caused by a collision due to simultaneous transmission with another UE but a decoding failure caused by a poor channel condition is high. In consideration of this, in order to maintain CWS without changing to a next step value, TB unit ACK in the CUL-DFI is transmitted. Alternatively, when a decoding result of a first CBG configuring the GUL TB is successful (ACK) or when a decoding result of first n CBGs is ACK, a method of transmitting the TB unit ACK in the CUL-DFI may also be used.

[Proposed method #5] It is a method of configuring HARQ-ACK information for CUL in CUL-DFI in units of CBG and feeding back when CBG unit (re)transmission is configured for CUL.

In this method, a HARQ-ACK feedback result for CUL PUSCH transmission in the CUL-DFI is configured in units of CBG when CUL transmission is set in units of CBG using one of the proposed methods in Section 3.1.

As described above, if a large TB including a plurality of CBs is transmitted through a wider band or if the HARQ operation is performed in units of TB in case where a phenomenon in which NACK is concentrated on some CBs due to time-selective interference, the entire TBs including the corresponding CB should be retransmitted even when NACK is reported due to failure of decoding of a few CBs, which is ineffective in terms of resource utilization.

Therefore, even in the NR unlicensed band, resource utilization efficiency may be increased by (re)transmitting CUL in units of CBG, and HARQ-ACK feedback should also be made in units of CBG in order to (re)transmit in units of CBG. For example, if a TB transmitted as CUL includes 4 CBGs and decoding results of each CBG are ACK/NACK/ACK/ACK, HARQ-ACK feedback information in the CUL-DFI may be configured as 4-bit bitmap to inform the UE about that second CBG in the corresponding TB has failed and the other remaining CBGs have been successful in decoding. Through this, it is possible to induce the UE to retransmit the second CBG to perform buffer flushing on the remaining CBGs.

[Proposed method #6] It is a method of configuring HARQ-ACK information for CUL in CUL-DFI in units of TB and feeding back when CBG unit (re)transmission is configured for CUL.

In this method, when CUL transmission is set in units of CBG by one of the proposed methods in Section 3.1, a HARQ-ACK feedback result for CUL PUSCH transmission in the CUL-DFI is configured in units of TB.

If the HARQ-ACK payload size that may be included in the CUL-DFI is not sufficient or fixed or limited to a specific size, HARQ-ACK feedback may be performed in units of TB even if CUL is set in units of CBG. In this case, if even one CBG among CBGs configuring the TB transmitted through the CUL PUSCH fails to decode, NACK in units of TB may be transmitted through the CUL-DFI to inform the UE that the entire CBGs, i.e., the corresponding TB, should be retransmitted.

In [Proposed method #5] and [Proposed method #6], a bitmap for distinguishing whether HARQ-ACK information in the CUL-DFI is in units of TB or CBG, TB unit HARQ-ACK feedback information, and CBG unit HARQ-ACK feedback information may be included and transmitted together in the CUL-DFI. Here, the TB/CBG unit classification bitmap may indicate whether the HARQ-ACK information in the CUL-DFI is in units of TB or CBG.

As an example of HARQ-ACK feedback configuring method for CBG unit CUL of the CUL-DFI, in a state where a UCI size is fixed to an N-bit TB/CBG classification bitmap, N-bit TB unit ACK/NACK, and M-bit CBG unit ACK/NACK, the M-bit may be divided by the number of HARQ IDs indicated in units of CBG in the bitmap to configure CBG ACK/NACK for each ID.

As an example, 8-bit bitmap=[T,T,T,T,T,C,C,T] (T is in units of TB, C is in units of CBG), 8-bit TB unit ACK/NACK=[A,A,A,A,N,N,N,N], M-bit CBG unit ACK/NACK may configure #4 #5 HARQ IDs as M/2-bit HARQ-ACK. Alternatively, ACK/NACK for X CBGs to be actually fed back among M bits configuring the CBG unit ACK/NACK result may be filled and the remaining (M-X) bits may be filled with NACK.

As another example, a 2N-bit bitmap may be configured, which is defined to express 2-bit={DTX or TB unit NACK or CBG NACK or ACK} for each HARQ ID, and a 16-bit bitmap may include may include M/3 for #4, #5, and #6 HARQ IDs as M/3-bit ACK/NACK. Alternatively, it may be configured by filling ACK/NACK for X CBGs to be actually fed back among M bits configuring the CBG unit ACK/NACK result and filling all remaining (M-X) bits with NACK.

The CUL-DFI CBG unit HARQ-ACK feedback configuration method of the proposed method and examples may also be applied in the same manner when the BS transmits DL data to the UE through the PDSCH and the UE performs PUCCH HARQ-ACK feedback in response to the corresponding PDSCH.

[Proposed method #14-1] It is a method of configuring and transmitting ACK/NACK information as follows when CBG unit (re)transmission is set in GUL and available CBG-unit HARQ-ACK feedback for GUL is included in CUL-DFI.

(1) ACK/NACK information for a first or scheduled first CBG transmitted on a time axis may be included and transmitted.

(2) ACK/NACK information obtained by bundling first N CBG unit ACK/NACKs which are first transmitted or scheduled on the time axis by a logical AND operation may be included and transmitted. However, the N may be a predetermined value or a value set or indicated in advance, and if it is not set or indicated, the UE may operate under the assumption of a specific default value.

(3) After the COT starts symbol, ACK/NACK information obtained by bundling ACK/NACK for all or part of CBGs included in a specific time interval T starting from a first data symbol by a logical AND operation may be included and transmitted.

Figure 15:
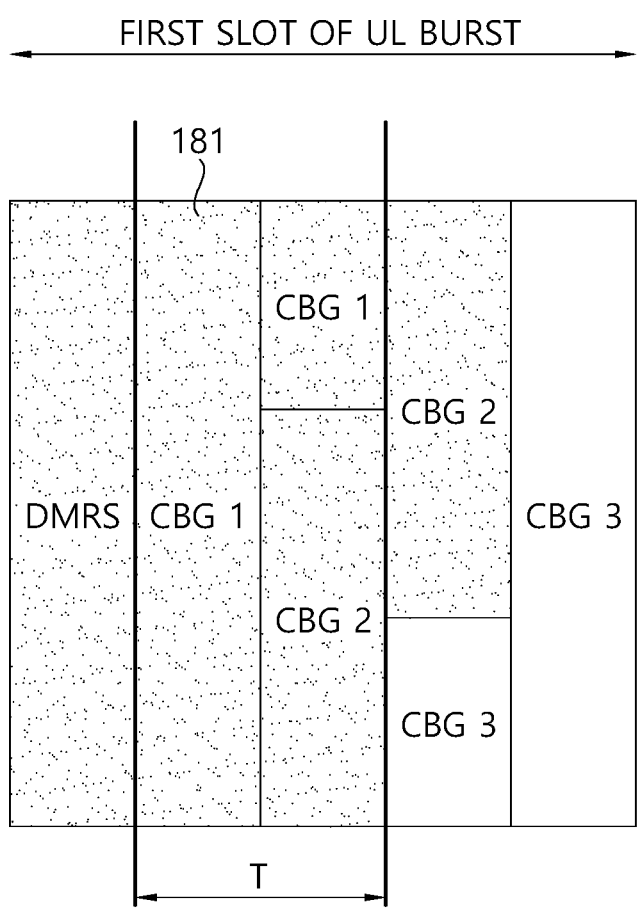
FIG. 15 shows an example of configuring ACK/NACK information according to (3).

FIG. 15 shows an example of configuring ACK/NACK information according to (3).

Referring to FIG. 15, a first data symbol after a symbol in which a COT starts may be 181. Also, T may be 2 (T=2). In this case, all of CBG 1 and part of CBG 2 are included in two symbol intervals starting from the first data symbol 181. In this case, according to (3), ACK/NACK for all of CBG 1 and ACK/NACK for part of CBG 2 may be bundled by a logical AND operation.

(4) ACK/NACK information obtained by bundling CBGs including the entire CBGs in a specific time interval T after the COT started symbol by a logical AND operation may be included and transmitted.

Figure 16:
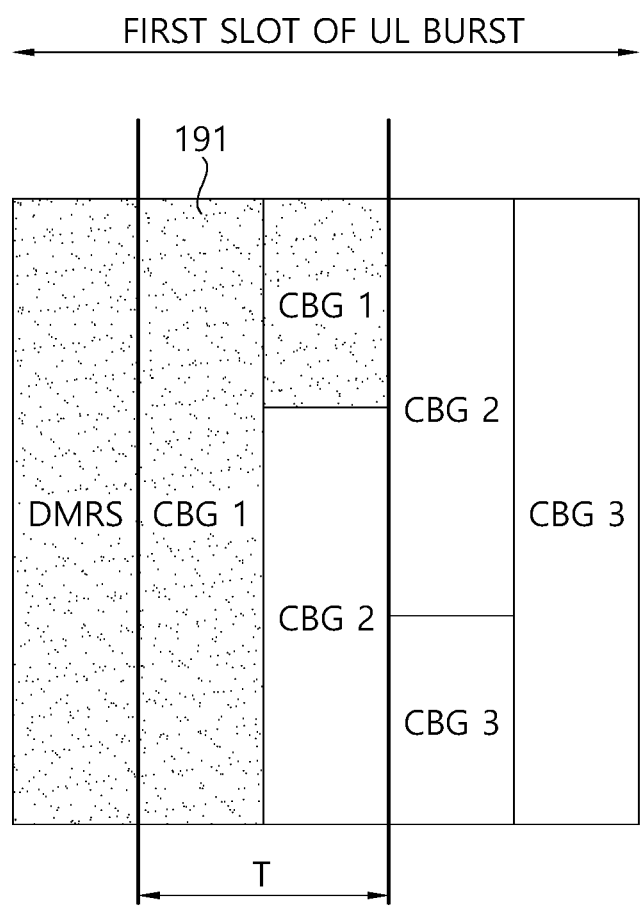
FIG. 16 shows an example of configuring ACK/NACK information according to (4).

FIG. 16 shows an example of configuring ACK/NACK information according to (4).

Referring to FIG. 16, a symbol at which COT starts may be 191 and T may be 2 (T=2). In this case, all of CBG 1 and part of CBG 2 are included in the two symbol intervals starting from the symbol 191 where the COT starts. In this case, according to (4), only ACK/NACK for all of CBG 1 is transmitted, and ACK/NACK is not transmitted since CBG 2 is only partially included in the two symbol intervals.

The T may be a predetermined value or a value set by the BS by a higher layer signal (e.g., RRC signal) or a dynamic control signal (e.g., downlink control information (DCI)).

The T may start from a first symbol among PUSCH data symbols included in the COT for each UE. Therefore, it may start differently for each UE or for each subcarrier spacing (SCS). For example, if a DMRS is located between the start symbol of the COT and the first data symbol of the PUSCH, T may start from the first data symbol of the PUSCH immediately after the DMRS. The DMRS may be transmitted even in a symbol other than the first symbol of the PUSCH, and a reference UL resource may be from the first PUSCH data symbol, not the DMRS symbol, to T or may be a T time resource excluding the DMRS symbol from the first data symbol of the PUSCH other than the DMRS symbol.

This method (proposed method #14-1) relates to a method of configuring ACK/NACK in case where GUL is set to CBG unit (re)transmission and HARQ-ACK feedback information for GUL is also included in the CUL-DFI. In LTE licensed-assisted access (LAA), ACK/NACK information for all HARQ process IDs including HARQ process IDs not set to AUL is included in AUL-DFI and transmitted, and the corresponding information may be used only for CWS adjustment of the UE. Similarly, in NR-U, ACK/NACK information for HARQ process ID transmitted to GUL other than the HARQ process ID set to CUL may be included in the CUL-DFI and utilized for CWS adjustment of the UE.

In the UL LBT process, when a UL grant is received in nth subframe, a first subframe of the latest UL transmission burst (Tx burst) before (n-3)th subframe may be set as a reference subframe. In addition, a size of a contention window (CW) may be adjusted based on an NDI for the HARQ process ID corresponding to the reference subframe. That is, if the BS toggles one or more NDIs (per TB) (or instructs retransmission for one or more TBs), it is assumed that transmission has failed due to collision of the PUSCH with another signal in the reference subframe and the size of the CW may be increased to a size of the CW second largest than the size of the currently applied CW in the predetermined CW size set. Otherwise, it may be assumed that the PUSCH in the reference subframe is successfully transmitted (without collision with other signals) and the CW size may be initialized to a minimum value (e.g., $CW_{min}$).

Similarly, when the CBG unit ACK/NACK information of the HARQ process ID transmitted to GUL is included in the CUL-DFI, i) ACK/NACK information for the first CBG which is first transmitted (or scheduled) earlier on the time axis within the reference UL resource or ii) ACK/NACK information obtained by bundling ACK/NACK for first N CBGs by a logical AND operation may be included in the CUL-DFI and transmitted. The UE may adjust the CWS based on this information.

As an example, if the first CBG of GUL in the reference UL resource included in the CUL-DFI is NACK, it may be assumed that transmission has failed due to collision with another signal and the CW size is increased to a one-step higher CW size, and if it is ACK, it may be assumed that transmission has been made without a collision with another signal and the CW size may be initialized to a minimum value. The assumption is that if the first CBG transmitted or scheduled earlier on the time axis in the reference UL resource is ACK, even if the remaining CBGs are NACK, a possibility of general decoding failure such as an influence of a channel or an MCS (modulation and coding) error rather than NACK due to collision with other signals is considered to be high. Alternatively, if the first CBG is NACK, it is assumed that there is a high possibility of decoding failure due to simultaneous signal transmission (i.e., collision) with other communication nodes. In the above, CUL may be configured as TB unit or CBG unit (re)transmission and HARQ-ACK feedback for CUL may include TB unit or CBG unit ACK/NACK information in the CUL-DFI.

[Proposed method #7] It is a method of selecting CUL retransmission resource based on HARQ-ACK information fed back through CUL-DFI.

Figure 17:
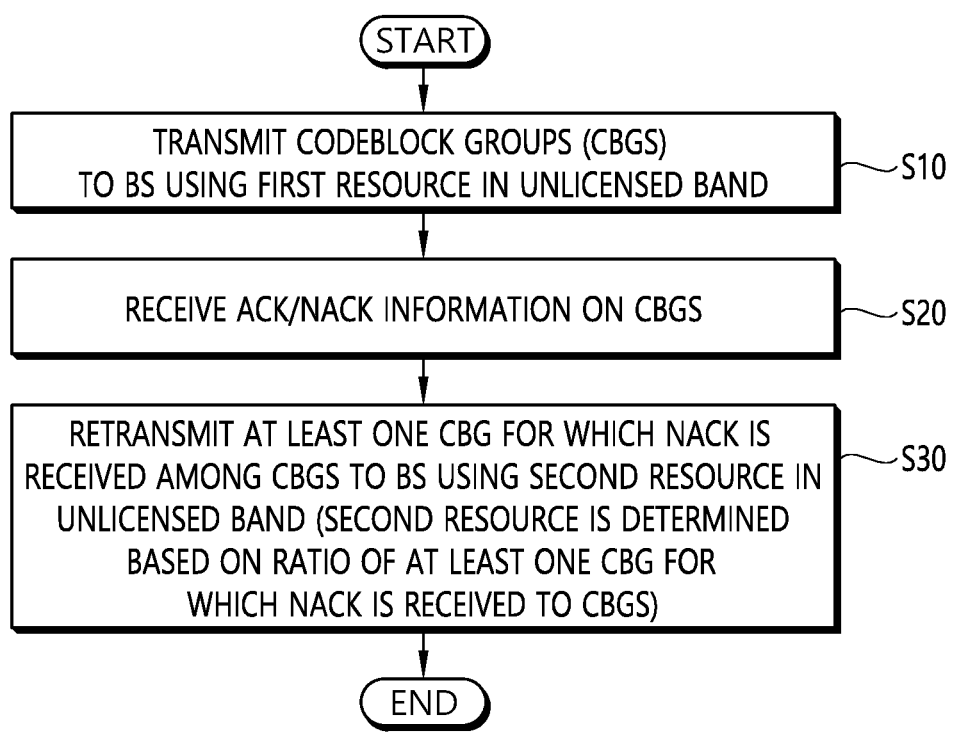
FIG. 17 illustrates a data transmission method of a UE in an unlicensed band according to the proposed method #7.

FIG. 17 illustrates a data transmission method of a UE in an unlicensed band according to the proposed method #7.

Referring to FIG. 17, the UE transmits codeblock groups (CBGs) to the BS using a first resource in the unlicensed band (S10).

The UE receives ACK/NACK information for the CBGs (S20) and retransmits at least one CBG for which a negative acknowledgment (NACK) is received among the CBGs using a second resource in the unlicensed band. Retransmit to (S30). The ACK/NACK information may include all ACK/NACKs for each of the CBGs or may include ACK/NACKs for each of the CBGs included in one transport block (TB) among the CBGs bundled by an AND operation (ANDing) or an OR operation (ORing). The UE may adjust the size of the contention window of the UE based on the ACK/NACK information.

The second resource may be determined based on a ratio of the CBGs and at least one CBG for which the NACK is received. The amount of the second resource may be an amount obtained by scaling the amount of the first resource in a time domain or in a frequency domain based on the ratio.

In addition, when retransmitting at least one CBG for which the NACK is received, information indicating the second resource may also be transmitted.

The first resource and the second resource may be included in uplink transmission resources (i.e., CUL resources) preset to the UE.

In addition, although not shown in FIG. 17, a listen before talk (LBT) process may be performed to check whether another communication node is using a channel before transmission using the first resource, and the LBT process may also be performed to check whether another communication node is using a channel even after retransmission using the second resource.

In addition, although not shown in FIG. 17, the UE may further include receiving an uplink grant and transmitting a specific CBG through a resource scheduled by the uplink grant. ACK/NACK information for the specific CBG may be received together with ACK/NACK information for the CBG transmitted using the first resource. However, as for the specific CBG, even when NACK is received, the specific CBG may not be retransmitted.

In addition, if the ratio between the number of CBGs and the number of at least one CBG received in response to NACK among the CBGs or the number of the at least one CBG is i) a specific value or greater, the retransmission may be performed using the second resource (CUL resource), and ii) if it is smaller than the specific value, the retransmission may be performed using a third resource (dynamically allocated resource) allocated by an uplink grant. That is, the resource used at the time of retransmission may be determined dependently on the number of CBGs that received NACK as a response (NACK occurred).

Hereinafter, each step of FIG. 17 will be described in more detail.

The CUL-DFI transmitted by the BS to the UE may include HARQ-ACK for the GUL HARQ process as well as the CUL HARQ process. However, all HARQ processes transmitted to GUL are not retransmitted to CUL. That is, even if the HARQ-ACK feedback result of GUL is NACK, retransmission of the corresponding HARQ-process is not performed using CUL resources, and the HARQ-ACK feedback result of GUL may be reflected only for CWS adjustment.

The UE performs retransmission on the TB or CBG that has failed to decode based on the HARQ-ACK feedback result for CUL in the CUL-DFI. Here, information on the TB or CBG retransmitted through CUL may be included in CUL-UCI (described in Section 3.3 below) to inform the BS of which HARQ ID is retransmitted and which TB or CBG is retransmitted.

Time and frequency resources set as CUL transmission resources may be used differently for CBG unit CUL retransmission. That is, in case of retransmitting only some CBGs, the CBGs may be retransmitted using only some time axis resources, while the frequency axis resources are maintained. As an example, in case where 14 symbols are CUL resources and only one of two previously transmitted CBGs fails to decode and NACK is fed back in the CUL-DFI, the failed CBG may be retransmitted using front seven symbols or rear seven symbols i) previously agreed with the BS or ii) set from the BS or iii) according to a LBT result, rather than using all 14 symbols. That is, the time axis resource may be scaled by the proportion of the CBG that needs to be retransmitted among the CBGs configuring the entire TB and used for retransmission.

In addition, CUL may be transmitted by selecting some BWs that have succeeded in LBT, among all CUL frequency axis resources, as transmission BWs according to the LBT result. Here, in the case of retransmitting only some CBGs, similar to the above example, even if all 10 RBs are set as CUL resources, in case where only one of the two CBGs is NACK, the one CBG which has failed to decode may be transmitted using only 5 RBs which were previously agreed with the BS or set from the BS. Similarly, frequency-axis resources may be scaled by the proportion of CBGs that need retransmission among CBGs configuring the entire TB and used for retransmission.

[Proposed method #14-2] When CUL is set as CBG unit (re)transmission through a higher layer signal (e.g., RRC signal) and the BS is enabled for CBG unit HARQ-ACK feedback for HARQ process set to CUL in CUL-DFI, the following operation may be performed.

(1) The UE may perform CBG unit (re)transmission using 'configured UL resource' (e.g., 20 RBs in 14 symbols) based on a result of decoding a corresponding CBG unit.

i. The UE performs retransmission on the CBG for which NACK has occurred using the 'configured UL resource' only when the number of CBGs in which NACK has occurred among CBGs configuring the transmitted TB is greater than or equal to a certain number or greater than a certain ratio. If the number is less than the specific number or less than the specific ratio, retransmission through the UL grant may be expected.

For example, the UE may transmit codeblock groups (CBGs) to the BS using a first resource in the unlicensed band and receive ACK/NACKs in response to the CBGs. In this case, the UE may retransmit at least one CBG for which NACK is received as a response among the CBGs to the BS using a second resource in the unlicensed band.

Here, if the ratio between the number of CBGs and the number of the at least one CBG for which NACK was received as a response among the CBGs or if the number of the at least one CBG is equal to or greater than a specific value (a predetermined value, a value set by a network, a value determined by an equation based on the number of CBGs, etc.), the UE may perform the retransmission using the second resource (CUL configuration resource). If it is less than the specific value, the retransmission may be performed using resources allocated by an uplink grant.

ii. If CBG retransmission is performed using 'configured UL resource', that is, if the number of CBGs in which NACK has occurred is greater than a certain number or greater than a certain ratio, a timer waiting for feedback after CUL-PUSCH transmission may not operate.

However, the ratio or number of CBGs in which NACK, which is a reference in the CBG unit retransmission using the 'configured UL resource' of the UE, has occurred may be a value previously agreed with the BS, set as a higher layer signal (e.g., RRC signaling), L1 signaling, or a combination of an higher layer signal and an L1 signal.

(2) Retransmission resource selection method when performing CBG unit (re)transmission using 'set UL resources' i. The CBG for which NACK has occurred may be retransmitted using some frequency or time-axis resources previously agreed with the BS or set by the BS in advance or retransmitted by scaling the frequency-axis resource by the ratio of the CBGs in which the NACK has occurred, and the frequency-axis resource scaling may be performed in units of interlace.

ii. The frequency axis or time axis scaling factor S may be calculated as, for example, S=(number of CBGs in which NACK occurs)/(total number of CBGs). Accordingly, the amount X of retransmission resource may be obtained by multiplying a predetermined or set frequency axis or time axis resource R by a scaling factor and then taking the ceil function as X=ceil(R×S). Here, ceil(x) is a function to find a minimum integer greater than or equal to x.

iii. When selecting some frequency axis or time axis resources for retransmission, an index previously agreed with the BS or indicated/set in advance may be used, and the UE may include information on which frequency axis or time axis index is used for retransmission in CUL-UCI and transmit the same to the BS.

However, in the above, a method in which the BS configures CBG unit (re)transmission for CUL is as follows.

A. A method of configuring all HARQ process IDs set to CUL as CBG unit (re)transmission.

B. A method of configuring only some HARQ process IDs set to CUL as CBG unit (re)transmission and the remaining HARQ process IDs as TB unit transmission.

In A and B, the BS may feed back the TB unit HARQ-ACK as the DFI to the UE even for the HARQ process ID set as CBG unit (re)transmission. Therefore, (1) and (2) may be applicable only to the CUL HARQ process ID for which the BS fed back CBG unit HARQ-ACK as DFI.

Like the 'grant-based UL transmission', even in the 'configured grant-based UL transmission', retransmission efficiency may be increased by transmitting only decoding-failed CBG, rather than unconditionally retransmitting the entire TB through CBG unit (re)transmission. In particular, in NR-U, all transmissions in the unlicensed band are performed based on LBT. That is, since transmission may be performed only when LBT is successful after confirming that a channel is idle before transmission, LBT is also involved in UL grant transmission of the BS. Therefore, UL based on a configured grant may be more useful.

In order to support CBG unit retransmission using the configured UL resource, first, CBG unit (re)transmission should be configured for the HARQ process ID in which CUL is set by a higher layer signal such as RRC and the BS should transmit CBG unit HARQ-ACK feedback for the CUL-PUSCH corresponding HARQ process ID to the UE. The UE may transmit only the CBG for which NACK has occurred based on the CBG unit decoding result in the CUL-DFI by configured UL resources.

Meanwhile, even if the HARQ-process ID set to CUL is set to CBG unit (re)transmission, the BS may instruct the UE to retransmit the CBG for which NACK has occurred through the UL grant. However, in this case, the BS may have to transmit the UL grant several times in order to instruct the CBG unit retransmission for each CUL HARQ process ID. In this process, a delay time required for retransmission may increase due to failure of the LBT and signaling overhead may increase. Therefore, it may be efficient for the BS not to transmit the UL grant and for the UE to retransmit only the decoding-failed CBG with configured UL resources.

When the UE performs CBG unit (re)transmission using the configured UL resources based on the corresponding CBG unit decoding result as in (1)-i, the UE may perform retransmission on the CBG for which NACK has occurred using the configured UL resource only when the number of NACK-occurred CBGs, among CBGs configuring the TB transmitted in the CUL-PUSCH, is greater than or equal to a certain number or greater than a certain ratio, and retransmission through the UL grant may be expected if it is less than the certain number or less than the certain ratio.

Here, even in the case of retransmission through the UL grant, CBG unit HARQ-ACK may be included for CWS adjustment of the UE in the DFI. When the number or ratio of CBGs in which NACK has occurred is small, it may be efficient to instruct retransmission by allocating UL resource smaller than that for transmitting TB including the corresponding CBG at an initial stage through the UL grant. In addition, when the number or ratio of CBGs in which NACK has occurred is large, a coding rate may be set to be lower than that for transmitting TB at the initial stage with UL resources configured at the time of (re)transmission, thereby increasing reliability. Retransmission through the configured UL resources may be efficient in terms of resource utilization when considering the amount of resources required for retransmission.

Meanwhile, when some CBGs are retransmitted with the configured UL resources, the retransmission resources may be determined as in (2)-i and (2)-ii described above in consideration of the occupied bandwidth rule. For example, when the UE initially transmits a TB including 4 CBGs using 5 interlaces (approximately 50 RBs) set to the 'configured UL resource' in CUL-PUSCH, NACK may be fed back due to decoding failure of two CBGs, which are half, and only half of the CBGs may be retransmitted. In this case, the interlace resource X used for retransmission may be X=ceil(5×1/2)=3, and retransmission may be performed using only 3 interlaces. As another example, when the UE initially transmits a TB including 4 CBGs using 11 symbols set to 'configured UL resource' in CUL-PUSCH, NACK may be fed back due to decoding failure of two CBGs, which are half, and only half of the CBGs may be retransmitted. In this case, symbol resource X used for retransmission may be X=ceil(11×1/2)=6, and retransmission may be performed using 6 symbols.

In addition, when the UE uses only some frequency or time axis resources for retransmission, the UE may use an index previously agreed with the BS or indicated/set in advance. For example, in case of retransmission using only 3 interlaces out of 5 interlaces above, it may be previously agreed or set/instruct in advance to select the largest index or the smallest 3 indexes among the 5 interlaces, and in the case of axis resources, it is possible to retransmit using the 6 foremost symbols on the time axis. The UE may include information on retransmission resource such as an interlace index or symbol index used for retransmission in the CUL-UCI and map it to a specific interlace or symbol. For example, if three interfaces having a large index among five interlaces is used for retransmission, the CUL-UCI may be mapped to the largest interface among them.

[Proposed method #12] It is a method of reducing HARQ-ACK payload in CUL-DFI by 2-dimensional (2D) HARQ-ACK feedback considering the number of starting positions of PUSCH when CBG unit retransmission scheduling of CUL is configured.

When CUL is set to CBG unit retransmission scheduling, payload of the CUL-DFI and CUL-UCI may be significantly increased because HARQ-ACK should be fed back in units of CBG and information on retransmitted CBGs should be included. Since the efficiency of CBG unit retransmission may be relatively reduced due to such signaling overhead, an efficient method capable of reducing HARQ-ACK payload while performing CBG unit retransmission is required.

Figure 18:
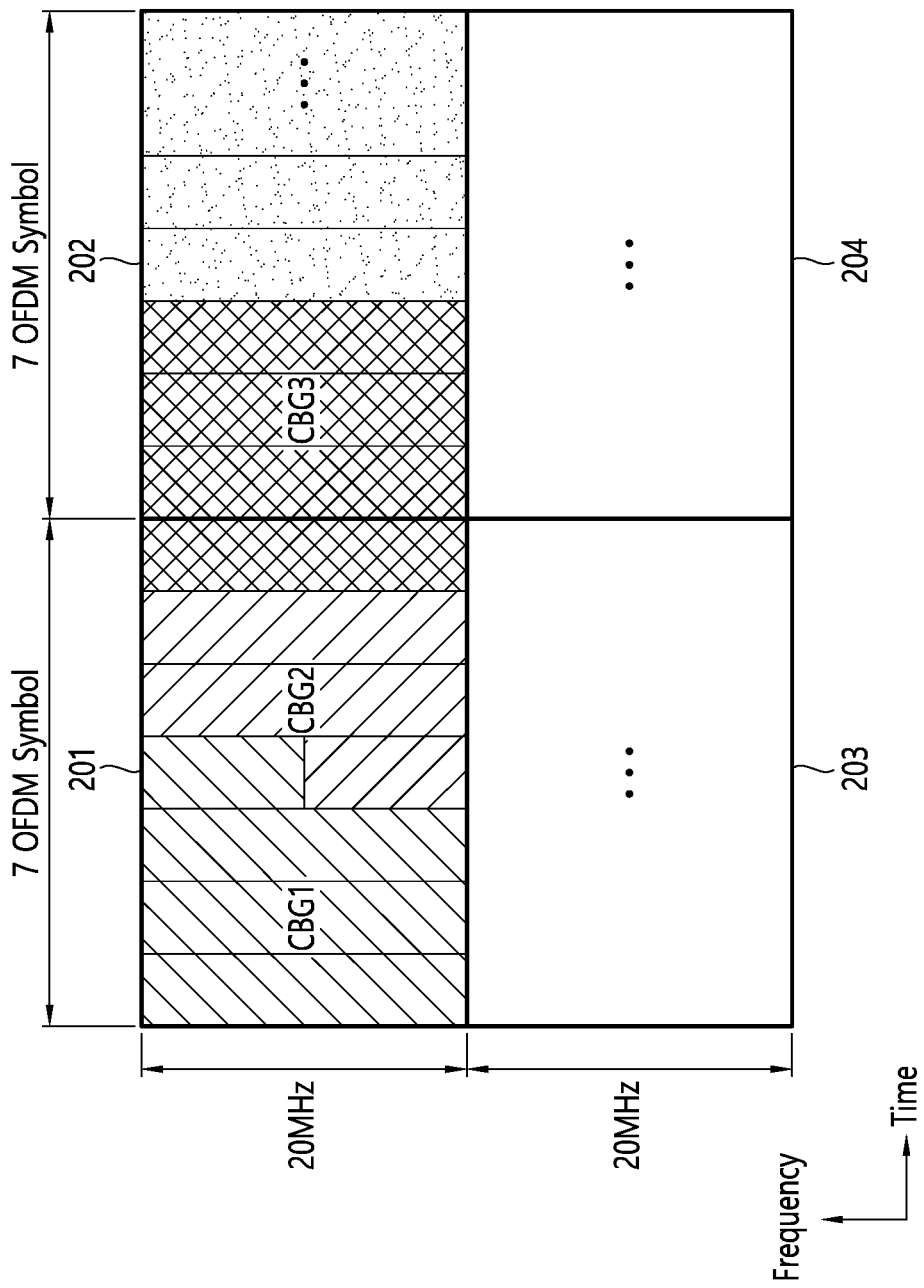
FIG. 18 illustrates a plurality of PUSCH starting positions and CBG mapping.

FIG. 18 illustrates a plurality of PUSCH starting positions and CBG mapping.

Referring to FIG. 18, a PUSCH starting position may be set in a plurality of resource regions (e.g., four: 201, 202, 203, 204) for CUL-PUSCH transmission. Each resource region may include 7 OFDM symbols×20 MHz. For CBG mapping, a situation in which a total of 8 CBGs are transmitted to CUL-PUSCH in order from the top left is considered. When CBG unit HARQ-ACK feedback is performed with the CUL-DFI, a HARQ-ACK bitmap including a total of 8 bits is required. In this situation, it is assumed that CBG2 of the CUL-PUSCH transmitted by the UE has failed to decode. When HARQ-ACK feedback is performed for each of the four PUSCH starting positions, it may be reported that a decoding failure occurs in CBG2 existing in a blue region in the bitmap including a total of 4 bits in the CUL-DFI. Then, the UE recognizes that NACK has occurred among the CBGs mapped to the blue region and may retransmit the blue region. Although other CBGs (i.e., CBG1 and CBG3) mapped to the blue region, as well as the CBG2, is retransmitted, a size of the HARQ-ACK payload of the CUL-DFI is reduced and CBG unit retransmission may be efficiently performed.

<Section 3.3: Method of Configuring CUL-UCI in Case of CBG Unit CUL Transmission>

In this section, a method of configuring CUL-UCI when the UE transmits information (e.g., HARQ ID, NDI, RV, AUL subframe starting position, AUL subframe ending position, etc.) required for receiving a CUL PUSCH together with the CUL PUSCH to the BS in a situation where CBG unit (re)transmission is configured is proposed.

[Proposed method #8] It is a method of including information on time and frequency axis resources used for retransmission in CUL-UCI in case of retransmitting only some CBGs that failed to decode among initially transmitted CBGs by CBG unit CUL.

This method is a method of reducing a burden of blind detection (BD) of the BS by including information on resource used for retransmission in the CUL-UCI in case where some CBGs required to be retransmitted is retransmitted using only some of time and frequency axis resources set as CUL resources as in [Proposed method #7] of section 3.2 described above.

That is, in case where the UE transmits CBG using some time and frequency resources of CUL resources according to the proportion of some CBGs requiring retransmission among all initially transmitted CBGs or in case where the UE retransmits CUL CBG using changed time and frequency resources based on LBT success/failure, information on the time and frequency axis resources actually used for retransmission may be included in the CUL-UCI to help the BS decode.

Characteristically, in order to inform the BS of the resource region in which the CBG is retransmitted through the CUL-UCI, a specific time/frequency axis granularity may be used. For example, on the frequency axis, frequency axis resource domain information retransmitted in units of 20 MHz may be provided.

[Proposed method #9] It is a method of transmitting UCI by using previously agreed or set default or reference time/frequency axis resource when mapping UCI to time and frequency axis transmission resources.

In this method, a time and frequency axis resource to be used for UCI transmission is previously agreed with the BS or set in advance, and the UCI is mapped and transmitted to the corresponding time and frequency axis resource. Specifically, considering time-axis resources first, transmission may be started only when LBT is successful in terms of the characteristics of unlicensed band communication, and when the UE performs symbol-based LBT for UCI transmission, if the LBT fails in a first symbol of a CUL slot, LBT is performed again in a second symbol, and transmission is actually started from a symbol where the LBT is successful. Therefore, mapping the UCI to a rear symbol rather than mapping the UCI to a preceding symbol in the slot to be transmitted may be advantageous for complete UCI transmission, when the LBT success probability is taken into consideration.

In addition, in the frequency axis resource, specific RBs are set as a reference, and CUL is transmitted only when the corresponding RBs succeed in LBT, and the entire CUL may be dropped when the LBT for the reference RB fails. If the UCI decoding fails, the entire CUL decoding will fail. In order to prevent this, the UCI may be repeatedly mapped and transmitted for each RB group. In this case, the RB group may be characterized as belonging to a specific LBT BW (e.g., 20 MHz), and the corresponding LBT BW may be defined in advance or may be set by higher layer signaling (or L1 signaling). The proposed method is not limited to CUL-UCI but may also be applied to general UCI transmission transmitted in the NR unlicensed band.

[Proposed method #10] It is a method of mapping coded bits in consideration of symbol unit LBT and frequency-first mapping method.

In this method, in a state of assuming frequency priority mapping as in the current NR, coded bits are mapped such that a parity is first disposed and a systematic bit is later disposed, in consideration of that preceding symbols are punctured due to LBT failure in the unlicensed band. For example, when CB1 and CB2 are mapped to symbol indexes #0, #1, #2, and #3, CB1 is mapped in order of symbol index #1 and #0 and CB2 is mapped in order of symbol index #3 and #2, thereby mapping coded bits. That is, it may be considered that more important information is mapped to a symbol that is temporally behind. This is not limited to downlink or uplink and CUL and is applicable to mapping of all coded bits on NR unlicensed band.

Characteristically, when the UE performs LBT to transmit CUL-UCI, if the LBT fails to a symbol position where a DMRS exists, the CUL PUSCH cannot be transmitted. Thus, the symbol position to which the CUL-UCI is mapped may be located after the DMRS symbol which may no longer be punctured due to LBT failure.

The proposed method is not limited to the CUL-UCI but may also be applied to general PUSCH transmission transmitted in the NR unlicensed band.

[Proposed method #11] It is a method of including information on retransmitted CBG in CUL-UCI and information for instructing buffer flushing for successful CBG in the CUL-UCI.

The UE may include information on which CBG is retransmitted in the CUL-UCI and provide the same to the BS, while retransmitting the CBG that has failed to decode at the initial transmission to the CUL. In addition, since the UE knows its previous transmission state, it may inform whether to empty the CBG buffer of the BS through CUL-UCI or may inform the BS of its previous transmission state.

For example, when information on the previous transmission state, such as whether it was a transmission failure due to LBT failure or a state in which some CBGs was not transmitted due to a belated LBT success, is informed to the BS through CUL-UCI, the BS may determine whether to empty the CBG buffer thereof based on the information. In addition, if the time and frequency resources that are not transmitted or transmitted among CUL resources are notified in the form of CUL-UCI, it may be difficult to encode the information on the corresponding slot immediately after LBT success, so that the time frequency resource region that has not been transmitted or transmitted for the previous slot(s) or a transmission region of the PUSCH corresponding to the same HARQ ID among the previous slots may be reported.

[Proposed method #13] It is a method of including CUL-DFI acknowledgment message or including information on CBG which is currently transmitted/attempted previously to be transmitted in CUL-PUSCH in CUL-UCI based on HARQ-ACK feedback information of CUL-DFI and transmitting the same.

In this method, a 1-bit or N-bit confirmation message is included in the CUL-UCI to confirm that the UE has properly received the CUL-DFI when the BS transmits CBG unit HARQ-ACK feedback for CUL-PUSCH received through the CUL-DFI. For example, if the UE transmits a confirmation message by setting 1 bit to '1' in CUL-UCI, it may be interpreted as indicating that a CBG reported by the BS as NACK in the CUL-DFI for the corresponding HARQ ID will be retransmitted. Alternatively, if all CBGs in the CUL-DFI are ACK, 1 bit (i.e., '1') of the CUL-UCI may be interpreted to mean that a new TB will be transmitted. Alternatively, if '0' is transmitted as a confirmation message, it may be interpreted to mean that the TB including all the CBGs previously transmitted to the BS will be retransmitted. Alternatively, when the HARQ-ACK feedback for the corresponding HARQ ID of the CUL-DFI sent by the BS is N bits, the corresponding N-bit information may be copied to the CUL-UCI as it is, and a feedback result received by the UE may be transmitted to the BS. Here, CB(G) corresponding to NACK may mean that they are retransmitted in the corresponding CUL-PUSCH, and a specific state of N-bit information (e.g., all N bits are '0') may be interpreted to mean that a TB including all the previously transmitted CBGs will be retransmitted.

Alternatively, an index of the CBG currently (re)transmitted in the CUL-UCI or an index of the CBG transmitted in the CUL-PUSCH corresponding to the same HARQ ID as the CUL-PUSCH to be currently transmitted among a previous CUL-PUSCH resource or a previously transmitted CUL-PUSCH may be included and transmitted to eliminate misunderstanding with the BS when performing CBG-unit CUL-PUSCH retransmission based on the CBG unit HARQ-ACK feedback information.

The content of the present disclosure is not limited to direct communication between UEs and may be used in uplink or downlink. In this case, a BS or a relay node may use the proposed methods.

Examples of the above-described proposed methods may also be included as one of the implementation methods of the present disclosure. And, therefore, it is an evident fact that the above-described examples can be understood as a type of proposed methods. Additionally, although the above-described proposed methods can be implemented independently, the method may also be implemented as a combined (or integrated) form of part of the proposed methods. For the information on the application or non-application of the proposed methods (or information on the rules of the proposed methods), a rule may be defined so that the information can be notified through a signal (e.g., a physical layer signal or a higher layer signal), which is predefined by the base station to the UE or by a transmitting UE to a receiving UE.

Figure 19:
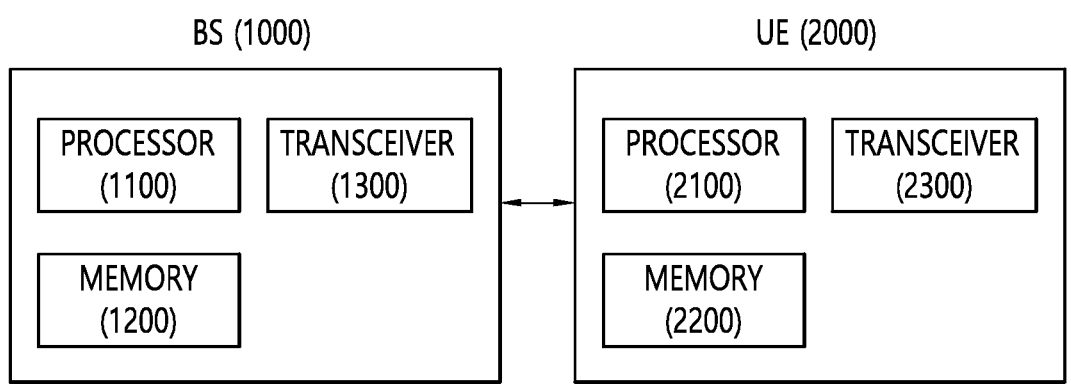
FIG. 19 is a block diagram showing components of a transmitting device (1810) and a receiving device (1820) for implementing the present disclosure.

FIG. 19 is a block diagram showing components of a transmitting device 1810 and a receiving device 1820 for implementing the present disclosure. Here, the transmitting device and the receiving device may be a base station and a terminal.

The transmitting device 1810 and the receiving device 1820 may respectively include transceivers 1812 and 1822 capable of transmitting or receiving radio frequency (RF) signals carrying information, data, signals and messages, memories 1813 and 1823 for storing various types of information regarding communication in a wireless communication system, and processors 1811 and 1821 connected to components such as the transceivers 1812 and 1822 and the memories 1813 and 1823 and configured to control the memories 1813 and 1823 and/or the transceivers 1812 and 1822 such that the corresponding devices perform at least one of embodiments of the present disclosure.

The memories 1813 and 1823 can store programs for processing and control of the processors 1811 and 1821 and temporarily store input/output information. The memories 1813 and 1823 may be used as buffers.

The processors 1811 and 1821 generally control overall operations of various modules in the transmitting device and the receiving device. Particularly, the processors 1811 and 1821 can execute various control functions for implementing the present disclosure. The processors 1811 and 1821 may be referred to as controllers, microcontrollers, microprocessors, microcomputers, etc. The processors 1811 and 1821 can be realized by hardware, firmware, software or a combination thereof. When the present disclosure is realized using hardware, the processors 1811 and 1821 may include ASICs (application specific integrated circuits), DSPs (digital signal processors), DSPDs (digital signal processing devices), PLDs (programmable logic devices), FPGAs (field programmable gate arrays) or the like configured to implement the present disclosure. When the present disclosure is realized using firmware or software, the firmware or software may be configured to include modules, procedures or functions for performing functions or operations of the present disclosure, and the firmware or software configured to implement the present disclosure may be included in the processors 1811 and 1821 or stored in the memories 1813 and 1823 and executed by the processors 1811 and 1821.

The processor 1811 of the transmitting device 1810 can perform predetermined coding and modulation on a signal and/or data to be transmitted to the outside and then transmit the signal and/or data to the transceiver 1812. For example, the processor 1811 can perform demultiplexing, channel coding, scrambling and modulation on a data string to be transmitted to generate a codeword. The codeword can include information equivalent to a transport block which is a data block provided by an MAC layer. One transport block (TB) can be coded into one codeword. Each codeword can be transmitted to the receiving device through one or more layers. The transceiver 1812 may include an oscillator for frequency up-conversion. The transceiver 1812 may include one or multiple transmission antennas.

The signal processing procedure of the receiving device 1820 may be reverse to the signal processing procedure of the transmitting device 1810. The transceiver 1822 of the receiving device 1820 can receive RF signals transmitted from the transmitting device 1810 under the control of the processor 1821. The transceiver 1822 may include one or multiple reception antennas. The transceiver 1822 can frequency-down-convert signals received through the reception antennas to restore baseband signals. The transceiver 1822 may include an oscillator for frequency down conversion. The processor 1821 can perform decoding and demodulation on RF signals received through the reception antennas to restore data that is intended to be transmitted by the transmitting device 1810.

The transceivers 1812 and 1822 may include one or multiple antennas. The antennas can transmit signals processed by the transceivers 1812 and 1822 to the outside or receive RF signals from the outside and deliver the RF signal to the transceivers 1812 and 1822 under the control of the processors 1811 and 1821 according to an embodiment of the present disclosure. The antennas may be referred to as antenna ports. Each antenna may correspond to one physical antenna or may be configured by a combination of a plurality of physical antenna elements. A signal transmitted from each antenna cannot be decomposed by the receiving device 1820. A reference signal (RS) transmitted corresponding to an antenna defines an antenna from the viewpoint of the receiving device 1820 and can allow the receiving device 1820 to be able to estimate a channel with respect to the antenna irrespective of whether the channel is a single radio channel from a physical antenna or a composite channel from a plurality of physical antenna elements including the antenna. That is, an antenna can be defined such that a channel carrying a symbol on the antenna can be derived from the channel over which another symbol on the same antenna is transmitted. A transceiver which supports a multi-input multi-output (MIMO) function of transmitting and receiving data using a plurality of antennas may be connected to two or more antennas.

Figure 20:
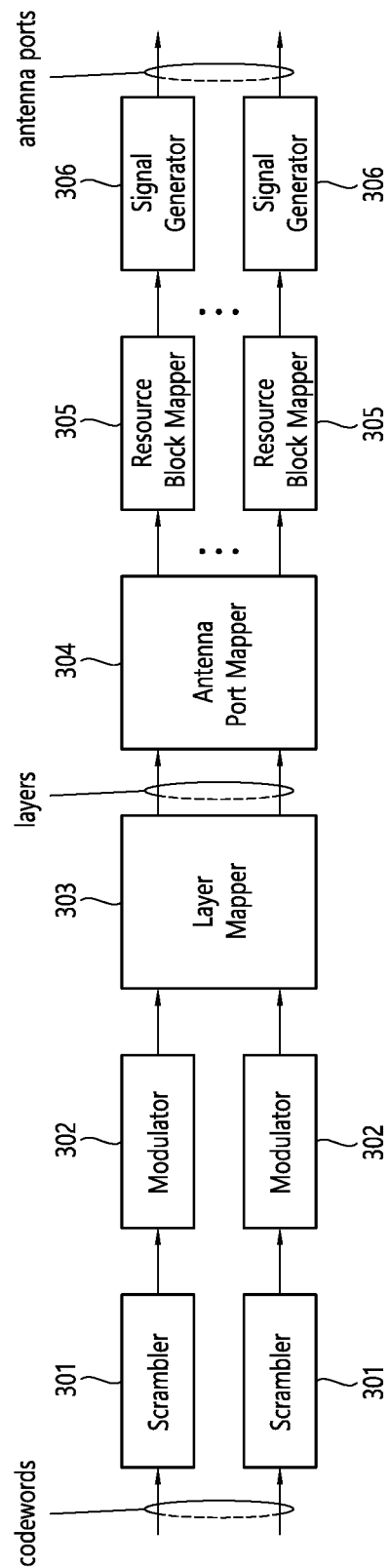
FIG. 20 illustrates an example of a signal processing module structure in the transmitting device (1810).

FIG. 20 illustrates an example of a signal processing module structure in the transmitting device 1810. Here, signal processing can be performed by a processor of a base station/terminal, such as the processors 1811 and 1821 of FIG. 19.

Referring to FIG. 20, the transmitting device 1810 included in a terminal or a base station may include scramblers 301, modulators 302, a layer mapper 303, an antenna port mapper 304, resource block mappers 305 and signal generators 306.

The transmitting device 1810 can transmit one or more codewords. Coded bits in each codeword are scrambled by the corresponding scrambler 301 and transmitted over a physical channel. A codeword may be referred to as a data string and may be equivalent to a transport block which is a data block provided by the MAC layer.

Scrambled bits are modulated into complex-valued modulation symbols by the corresponding modulator 302. The modulator 302 can modulate the scrambled bits according to a modulation scheme to arrange complex-valued modulation symbols representing positions on a signal constellation. The modulation scheme is not limited and m-PSK (m-Phase Shift Keying) or m-QAM (m-Quadrature Amplitude Modulation) may be used to modulate the coded data. The modulator may be referred to as a modulation mapper.

The complex-valued modulation symbols can be mapped to one or more transport layers by the layer mapper 303. Complex-valued modulation symbols on each layer can be mapped by the antenna port mapper 304 for transmission on an antenna port.

Each resource block mapper 305 can map complex-valued modulation symbols with respect to each antenna port to appropriate resource elements in a virtual resource block allocated for transmission. The resource block mapper can map the virtual resource block to a physical resource block according to an appropriate mapping scheme. The resource block mapper 305 can allocate complex-valued modulation symbols with respect to each antenna port to appropriate subcarriers and multiplex the complex-valued modulation symbols according to a user.

Each signal generator 306 can modulate complex-valued modulation symbols with respect to each antenna port, that is, antenna-specific symbols, according to a specific modulation scheme, for example, OFDM (Orthogonal Frequency Division Multiplexing), to generate a complex-valued time domain OFDM symbol signal. The signal generator can perform IFFT (Inverse Fast Fourier Transform) on the antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator may include an IFFT module, a CP inserting unit, a digital-to-analog converter (DAC) and a frequency upconverter.

Figure 21:
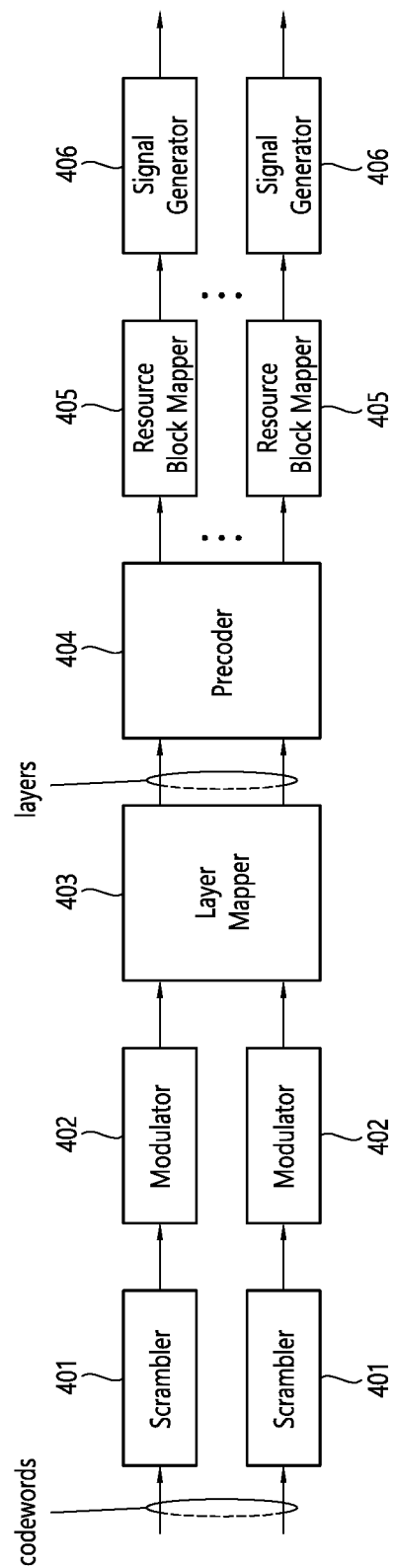
FIG. 21 illustrates another example of the signal processing module structure in the transmitting device (1810).

FIG. 21 illustrates another example of the signal processing module structure in the transmitting device 1810. Here, signal processing can be performed by a processor of a terminal/base station, such as the processors 1811 and 1821 of FIG. 19.

Referring to FIG. 21, the transmitting device 1810 included in a terminal or a base station may include scramblers 401, modulators 402, a layer mapper 403, a precoder 404, resource block mappers 405 and signal generators 406.

The transmitting device 1810 can scramble coded bits in a codeword by the corresponding scrambler 401 and then transmit the scrambled coded bits through a physical channel.

Scrambled bits are modulated into complex-valued modulation symbols by the corresponding modulator 402. The modulator can modulate the scrambled bits according to a predetermined modulation scheme to arrange complex-valued modulation symbols representing positions on a signal constellation. The modulation scheme is not limited and pi/2-BPSK (pi/2-Binary Phase Shift Keying), m-PSK (m-Phase Shift Keying) or m-QAM (m-Quadrature Amplitude Modulation) may be used to modulate the coded data.

The complex-valued modulation symbols can be mapped to one or more transport layers by the layer mapper 403.

Complex-valued modulation symbols on each layer can be precoded by the precoder 404 for transmission on an antenna port. Here, the precoder may perform transform precoding on the complex-valued modulation symbols and then perform precoding. Alternatively, the precoder may perform precoding without performing transform precoding. The precoder 404 can process the complex-valued modulation symbols according to MIMO using multiple transmission antennas to output antenna-specific symbols and distribute the antenna-specific symbols to the corresponding resource block mapper 405. An output z of the precoder 404 can be obtained by multiplying an output y of the layer mapper 403 by an N*M precoding matrix W. Here, N is the number of antenna ports and M is the number of layers.

Each resource block mapper 405 maps complex-valued modulation symbols with respect to each antenna port to appropriate resource elements in a virtual resource block allocated for transmission.

The resource block mapper 405 can allocate complex-valued modulation symbols to appropriate subcarriers and multiplex the complex-valued modulation symbols according to a user.

Each signal generator 406 can modulate complex-valued modulation symbols according to a specific modulation scheme, for example, OFDM, to generate a complex-valued time domain OFDM symbol signal. The signal generator 406 can perform IFFT (Inverse Fast Fourier Transform) on antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator 406 may include an IFFT module, a CP inserting unit, a digital-to-analog converter (DAC) and a frequency upconverter.

The signal processing procedure of the receiving device 1820 may be reverse to the signal processing procedure of the transmitting device. Specifically, the processor 1821 of the transmitting device 1810 decodes and demodulates RF signals received through antenna ports of the transceiver 1822. The receiving device 1820 may include a plurality of reception antennas, and signals received through the reception antennas are restored to baseband signals, and then multiplexed and demodulated according to MIMO to be restored to a data string intended to be transmitted by the transmitting device 1810. The receiving device 1820 may include a signal restoration unit which restores received signals to baseband signals, a multiplexer for combining and multiplexing received signals, and a channel demodulator for demodulating multiplexed signal strings into corresponding codewords. The signal restoration unit, the multiplexer and the channel demodulator may be configured as an integrated module or independent modules for executing functions thereof. More specifically, the signal restoration unit may include an analog-to-digital converter (ADC) for converting an analog signal into a digital signal, a CP removal unit which removes a CP from the digital signal, an FET module for applying FFT (fast Fourier transform) to the signal from which the CP has been removed to output frequency domain symbols, and a resource element demapper/equalizer for restoring the frequency domain symbols to antenna-specific symbols. The antenna-specific symbols are restored to transport layers by the multiplexer and the transport layers are restored by the channel demodulator to codewords intended to be transmitted by the transmitting device.

Figure 22:
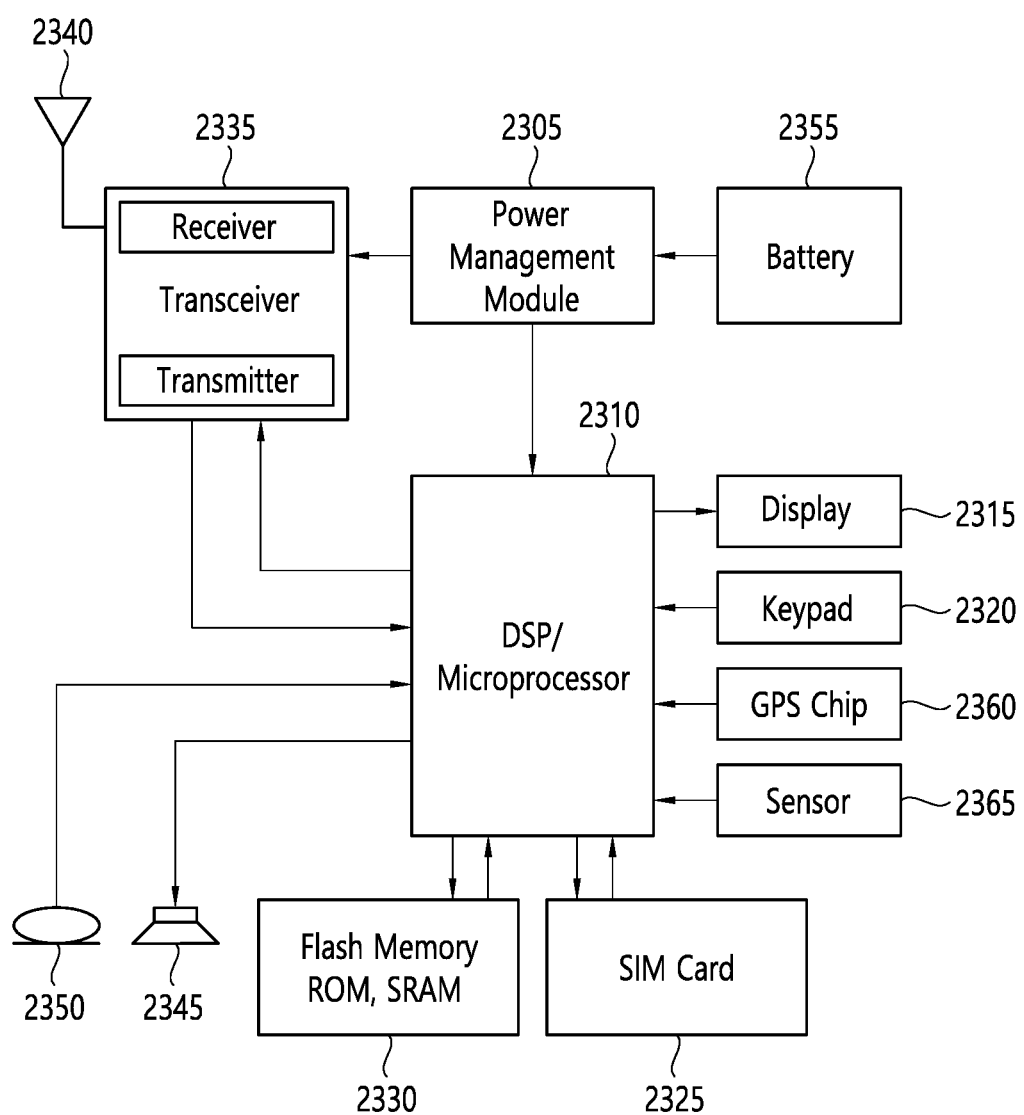
FIG. 22 illustrates an example of a wireless communication device according to an implementation example of the present disclosure.

FIG. 22 illustrates an example of a wireless communication device according to an implementation example of the present disclosure.

Referring to FIG. 22, the wireless communication device, for example, a terminal may include at least one of a processor 2310 such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345 and a microphone 2350. A plurality of antennas and a plurality of processors may be provided.

The processor 2310 can implement functions, procedures and methods described in the present description. The processor 2310 in FIG. 22 may be the processors 1811 and 1821 in FIG. 19.

The memory 2330 is connected to the processor 2310 and stores information related to operations of the processor. The memory may be located inside or outside the processor and connected to the processor through various techniques such as wired connection and wireless connection. The memory 2330 in FIG. 22 may be the memories 1813 and 1823 in FIG. 19.

A user can input various types of information such as telephone numbers using various techniques such as pressing buttons of the keypad 2320 or activating sound using the microphone 2350. The processor 2310 can receive and process user information and execute an appropriate function such as calling using an input telephone number. In some scenarios, data can be retrieved from the SIM card 2325 or the memory 2330 to execute appropriate functions. In some scenarios, the processor 2310 can display various types of information and data on the display 2315 for user convenience.

The transceiver 2335 is connected to the processor 2310 and transmit and/or receive RF signals. The processor can control the transceiver in order to start communication or to transmit RF signals including various types of information or data such as voice communication data. The transceiver includes a transmitter and a receiver for transmitting and receiving RF signals. The antenna 2340 can facilitate transmission and reception of RF signals. In some implementation examples, when the transceiver receives an RF signal, the transceiver can forward and convert the signal into a baseband frequency for processing performed by the processor. The signal can be processed through various techniques such as converting into audible or readable information to be output through the speaker 2345. The transceiver in FIG. 22 may be the transceivers 1812 and 1822 in FIG. 19.

Although not shown in FIG. 22, various components such as a camera and a universal serial bus (USB) port may be additionally included in the terminal. For example, the camera may be connected to the processor 2310.

Figure 23:
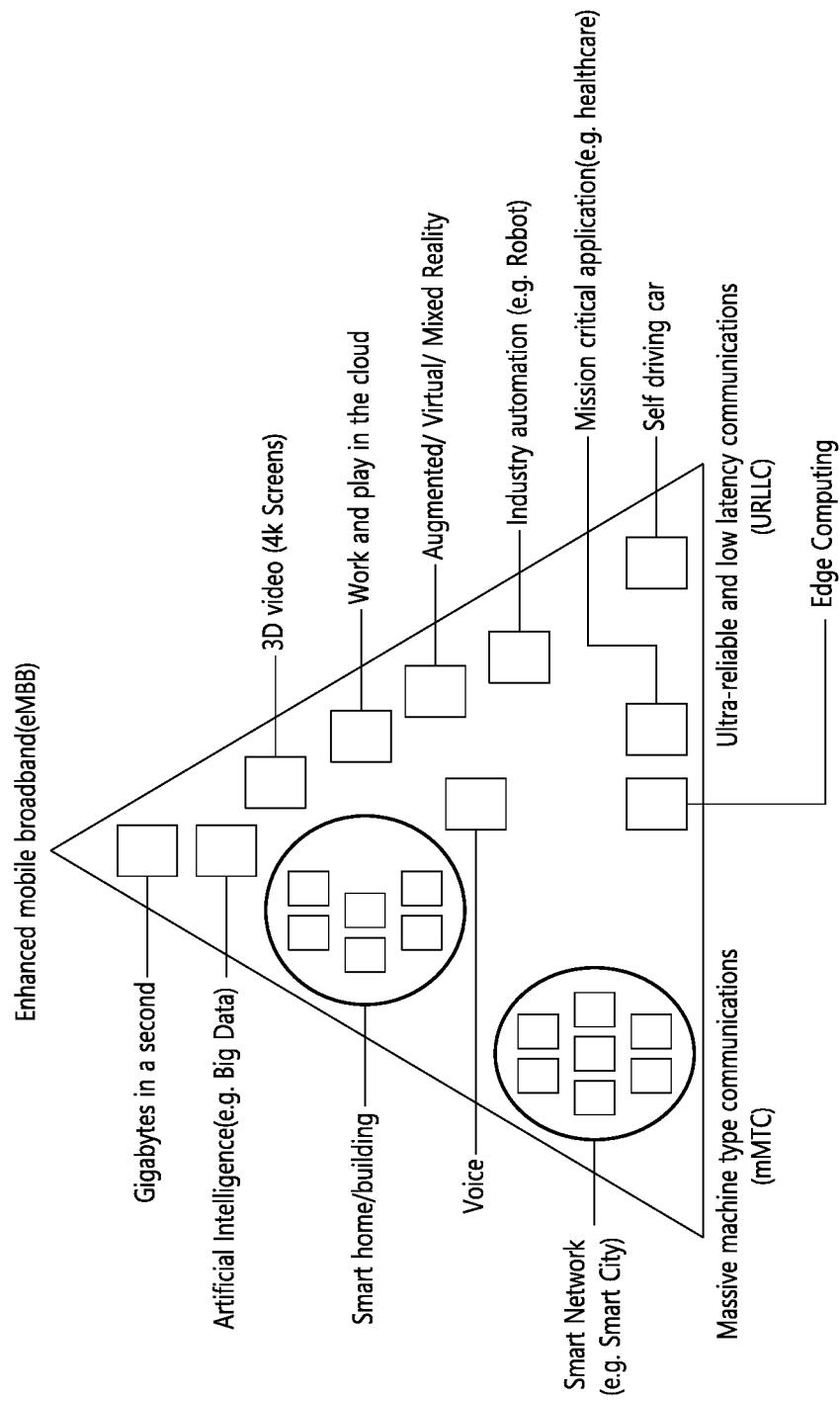
FIG. 23 shows an example of a 5G usage scenario to which the technical features of the present disclosure may be applied.

FIG. 23 is an example of implementation with respect to the terminal and implementation examples of the present disclosure are not limited thereto. The terminal need not essentially include all the components shown in FIG. 23. That is, some of the components, for example, the keypad 2320, the GPS chip 2360, the sensor 2365 and the SIM card 2325 may not be essential components. In this case, they may not be included in the terminal.

FIG. 23 shows an example of a 5G usage scenario to which the technical features of the present disclosure may be applied.

The 5G usage scenario shown in FIG. 23 is merely illustrative, and the technical features of the present disclosure may be applied to other 5G usage scenarios not shown in FIG. 23.

Referring to FIG. 23, the three main requirement areas of 5G are (1) an enhanced mobile broadband (eMBB) area, and (2) massive machine type communication (mMTC) area, and (3) ultra-reliable and low latency communication (URLLC) area. Some use cases may require multiple areas for optimization, and other use cases may focus only on one key performance indicator (KPI). 5G supports these various use cases in a flexible and reliable way.

eMBB focuses on overall improvement of data rate, latency, user density, capacity and coverage of mobile broadband access. EMBB targets throughput of about 10 Gbps. EMBB goes far beyond basic mobile Internet access, covering rich interactive work and media and entertainment applications in the cloud or augmented reality. Data is one of the key drivers of 5G, and it may not be possible to see dedicated voice services for the first time in the 5G era. In 5G, voice is expected to be processed as an application program simply using data connection provided by a communication system. A main reason for an increased traffic volume is an increase in content size and an increase in the number of applications requiring high data rates. Streaming services (audio and video), interactive video and mobile Internet connections will become more prevalent as more devices are connected to the Internet. Many of these applications require always-on connectivity to push real-time information and notifications to the user. Cloud storage and applications are increasing rapidly in mobile communication platforms, which may be applied to both work and entertainment. Cloud storage is a special use case that drives growth of uplink data rates. 5G is also used for remote work in the cloud and requires much lower end-to-end latency to maintain a good user experience when tactile interfaces are used. In entertainment, for example, cloud gaming and video streaming are another key factor in increasing demand for mobile broadband capabilities. Entertainment is essential on smartphones and tablets anywhere, including in highly mobile environments such as trains, cars, and airplanes. Another use case is augmented reality and information retrieval for entertainment. Here, augmented reality requires very low latency and instantaneous data amount.

The mMTC is designed to enable communication between a large number of low-cost devices powered by batteries and is intended to support applications such as smart weighing, logistics, field and body sensors. The mMTC targets 10 years of batteries and/or 1 million units per $km^2$. The mMTC enables seamless connection of embedded sensors in all fields and is one of the most anticipated 5G use cases. Potentially, IoT devices are predicted to reach 20.4 billion by 2020. Industrial IoT is one of the areas where 5G plays a major role in enabling smart cities, asset tracking, smart utilities, agriculture and security infrastructure.

URLLC is ideal for vehicle communications, industrial control, factory automation, teleoperation, smart grid and public safety applications by allowing devices and machines to communicate with high reliability, very low latency, and high availability. URLLC aims for delay of about 1 ms. URLLC includes new services that will transform the industry through ultra-reliable/low-latency links such as remote control of major infrastructure and autonomous vehicles. The level of reliability and delay is essential for smart grid control, industrial automation, robotics, drone control and coordination.

Next, a number of examples of use included in a triangle of FIG. 23 will be described in more detail.

5G may complement fiber-to-the-home (FTTH) and cable-based broadband (or DOCSIS) as a means of providing streams rated from hundreds of megabits per second to gigabits per second. Such a high speed may be required to deliver TVs with resolution of 4K or higher (6K, 8K and higher) as well as virtual reality (VR) and augmented reality (AR). VR and AR applications include almost immersive sports events. Certain applications may require special network configuration. In the case of VR games, for example, a game company may need to integrate a core server with a network operator's edge network server to minimize latency.

Automotive is expected to be an important new driving force in 5G along with many use cases for mobile communication for vehicles. For example, entertainment for passengers simultaneously require high capacity and high mobile broadband. The reason is that future users will continue to expect high-quality connections, regardless of their location and speed. Another use case in the automotive sector is an augmented reality dashboard. The augmented reality contrast board allows a driver to identify objects in the dark on top of what they see through a front window. The augmented reality dashboard displays information to be provided to the driver about a distance and movement of objects in an overlapping manner. In the future, wireless modules enable communication between vehicles, exchange of information between a vehicle and a supported infrastructure, and exchange of information between a vehicle and other connected devices (e.g., devices carried by a pedestrian). A safety system may lower the risk of accidents by guiding a driver to alternative courses of action to make driving safer. A next step will be a remotely controlled vehicle or an autonomous vehicle. This requires very reliable and very fast communication between different autonomous vehicles and/or between vehicles and infrastructure. In the future, autonomous vehicles will perform all driving activities, and drivers will focus only on traffic anomalies that the vehicle itself cannot identify. Technical requirements of autonomous vehicles require ultra-low latency and ultra-fast reliability to increase traffic safety to levels that cannot be achieved by humans.

Smart cities and smart homes referred to as smart society will be embedded with high-density wireless sensor networks. A distributed network of intelligent sensors will identify cost of a city or home and conditions for energy efficient maintenance. A similar setup may be done for each household. Temperature sensors, window and heating controllers, burglar alarms and home appliances are all wirelessly connected. Many of these sensors typically require low data rates, low power, and low cost. However, for example, real-time HD video may be required in certain types of devices for surveillance.

Consumption and distribution of energy including heat or gas is highly decentralized, requiring automated control of distributed sensor networks. A smart grid interconnects these sensors using digital information and communication technologies to collect information and act accordingly. This information may include behavior of suppliers and consumers, enabling smart grids to improve efficiency, reliability, economic efficiency, sustainability of production, and distribution of fuels such as electricity in an automated manner. The smart grid may also be considered as a low-latency sensor network.

A health sector has many applications that may benefit from mobile communications. The communication system may support telemedicine providing clinical care from remote locations. This may help reduce barriers to distance and improve access to medical services that are not consistently available in remote rural areas. It is also used to save lives in critical care and emergencies. A wireless sensor network based on mobile communication may provide remote monitoring and sensors for parameters such as heart rate and blood pressure.

Wireless and mobile communications are becoming increasingly important in industrial applications. Wiring is expensive to install and maintain. Thus, a possibility of replacing cables with reconfigurable wireless links is an attractive opportunity for many industries. However, achieving this requires that the wireless connection operates with delay, reliability and capacity similar to those of cables and simplification in management thereof. Low latency and very low error probability are new requirements that need to be connected to 5G.

Logistics and cargo tracking is an important use case for mobile communications that enables tracking of inventory and packages anywhere using location-based information systems. Use cases of logistics and freight tracking typically require low data rates but require a wide range and reliable location information.

Figure 24:
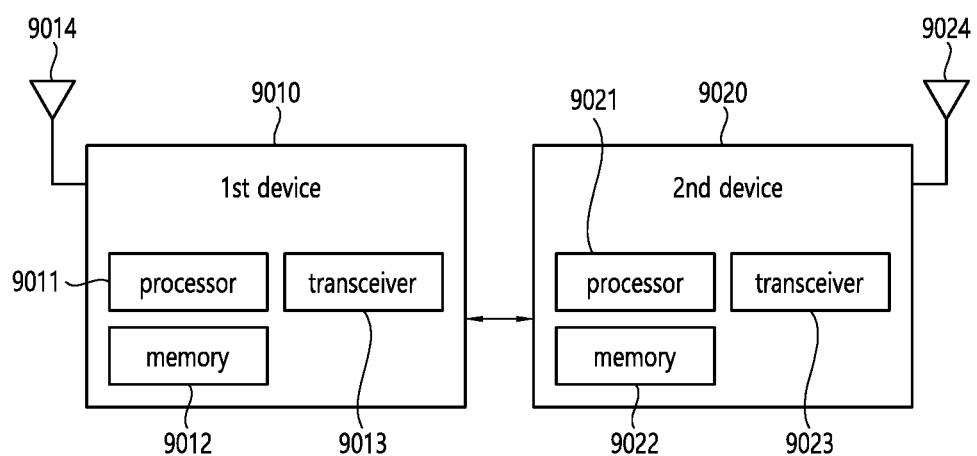
FIG. 24 shows a wireless communication device according to an embodiment of the present disclosure.

FIG. 24 shows a wireless communication device according to an embodiment of the present disclosure.

Referring to FIG. 24, the wireless communication system may include a first device 9010 and a second device 9020.

The first device 9010 may be a BS, a network node, a transmitting UE, a receiving UE, a wireless device, a wireless communication device, a vehicle, a vehicle equipped with an autonomous driving function, a connected car, a drone (unmanned aerial vehicle (UAV)), artificial intelligence (AI) module, robot, augmented reality (AR) device, virtual reality (VR) device, mixed reality (MR) device, hologram device, public safety device, MTC device, IoT device, medical device, a fintech device (or a financial device), a security device, a climate/environment device, a device related to 5G service, or a device related to the fourth industrial revolution field.

The second device 9020 may be a BS, a network node, a transmitting UE, a receiving UE, a wireless device, a wireless communication device, a vehicle, a vehicle equipped with an autonomous driving function, a connected car, a drone (unmanned aerial vehicle (UAV)), artificial intelligence (AI) module, robot, augmented reality (AR) device, virtual reality (VR) device, mixed reality (MR) device, hologram device, public safety device, MTC device, IoT device, medical device, a fintech device (or a financial device), a security device, a climate/environment device, a device related to 5G service, or a device related to the fourth industrial revolution field.

For example, the UE may include a mobile phone, a smart phone, a laptop computer, a digital broadcasting UE, a personal digital assistants (PDA), a portable multimedia player (PMP), a navigation system, and a slate PC, a tablet PC, ultrabook, wearable device (e.g., smartwatch, smart glass, head mounted display (HMD), etc.). For example, the HMD may be a display device worn on the head. For example, HMD may be used to implement VR, AR or MR.

For example, the drone may be a non-human vehicle that is flying by radio control signals. For example, the VR device may include a device that implements an object or a background of a virtual world. For example, the AR device may include a device that implements by connecting an object or background of a virtual world to an object or background of the real world. For example, the MR device may include a device that implements by combining an object or background of a virtual world to an object or background of the real world. For example, the hologram device may include a device that implements a 360-degree stereoscopic image by recording and reproducing stereoscopic information by utilizing an interference phenomenon of light generated as two laser lights called holography meet. For example, the public safety device may include an image relay device or an image device wearable on a user's human body. For example, the MTC device and the IoT device may be devices that do not require direct human intervention or operation. For example, the MTC device and the IoT device may include a smart meter, a bending machine, a thermometer, a smart light bulb, a door lock, or various sensors. For example, the medical device may be a device used for the purpose of diagnosing, treating, alleviating, treating, or preventing a disease. For example, the medical device may be a device used for the purpose of diagnosing, treating, alleviating, or correcting an injury or disorder. For example, the medical device may be a device used for the purpose of examining, replacing or modifying a structure or function. For example, the medical device may be a device used for the purpose of controlling pregnancy. For example, the medical device may include a device for treatment, a device for surgery, a device for (extra-corporeal) diagnosis, a device for hearing aid or a surgical procedure. For example, the security device may be a device installed to prevent a risk that may occur and maintain safety. For example, the security device may be a camera, CCTV, recorder, or black box. For example, the fintech device may be a device capable of providing financial services such as mobile payment. For example, the fintech device may include a payment device or a point of sales (POS). For example, the climate/environment device may include a device that monitors or predicts a climate/environment.

The first device 9010 may include at least one processor such as a processor 9011, at least one memory such as a memory 9012, and at least one transceiver such as a transceiver 9013. The processor 9011 may perform the functions, procedures, and/or methods described above. The processor 9011 may perform one or more protocols. For example, the processor 9011 may perform one or more layers of an air interface protocol. The memory 9012 may be connected to the processor 9011 and may store various types of information and/or commands. The transceiver 9013 may be connected to the processor 9011 and controlled to transmit and receive wireless signals.

The second device 9020 may include at least one processor such as a processor 9021, at least one memory device such as a memory 9022, and at least one transceiver such as a transceiver 9023. The processor 9021 may perform the functions, procedures, and/or methods described above. The processor 9021 may implement one or more protocols. For example, the processor 9021 may implement one or more layers of an air interface protocol. The memory 9022 may be connected to the processor 9021 and may store various types of information and/or commands. The transceiver 9023 may be connected to the processor 9021 and may be controlled to transmit and receive wireless signals.

The memory 9012 and/or the memory 9022 may be connected inside or outside the processor 9011 and/or the processor 9021, respectively, and may be connected to another processor through various technologies such as wired or wireless connection.

The first device 9010 and/or the second device 9020 may have one or more antennas. For example, an antenna 9014 and/or an antenna 9024 may be configured to transmit and receive wireless signals.

The present disclosure may be applied to the following fields.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving or Autonomous Driving>

Autonomous driving refers to self-driving technology, and autonomous driving vehicle refers to a vehicle that is driven without a user's operation or with a user's minimal operation.

For example, autonomous driving may include a technology that maintains a lane in which a vehicle is driving, a technology that automatically adjusts a speed such as adaptive cruise control, a technology that automatically travels along a specified route, and a technology that automatically sets a route when a destination is set and drives along the route.

The vehicle includes all of a vehicle including only an internal combustion engine, a hybrid vehicle including an internal combustion engine and an electric motor, and an electric vehicle including only an electric motor, and may include not only automobiles but also trains and motorcycles.

Here, the autonomous vehicle may be considered as a robot having an autonomous driving function.

<eXtended Reality (XR)>

Extended reality collectively refers to virtual reality (VR), augmented reality (AR), and mixed reality (MR). The VR technology provides only CG images of real world objects or backgrounds, the AR technology provides virtually created CG images on top of real object images, and the MR technology is a computer graphic technology that mixes and combines virtual objects in the real world to provide the same.

The MR technology is similar to the AR technology in that it shows real and virtual objects together. However, in the AR technology, virtual objects are used in a form that complements real objects, whereas in the MR technology, virtual objects and real objects are used with equal characteristics.

The XR technology may be applied to head-mounted display (HMD), head-up display (HUD), mobile phones, tablet PCs, laptops, desktops, TVs, digital signage, etc., and a device employing the XR technology may be referred to as an XR Device.

What is claimed is:

1. A method of transmitting data of a user equipment (UE) in an unlicensed band, the method comprising:
   transmitting codeblock groups (CBGs) to a base station (BS) using a first resource in the unlicensed band;
   receiving acknowledgement/negative acknowledgement (ACK/NACK) in response to the CBGs; and
   retransmitting at least one CBG for which NACK is received as a response, among the CBGs, to the BS using a second resource in the unlicensed band,
   wherein the second resource is determined based on a ratio of a number of the at least one CBG for which the NACK is received to a number of the CBGs, and
   wherein, when an amount of the first resource is R, the ratio, which is obtained by dividing the number of the at least one CBG for which the NACK is received by the number of the CBGs, is S, an amount of the second resource is obtained as ceil(R×S), and the second resource is selected from a resource having a lowest index or a highest index among resources having the resource amount of R.

2. The method of claim 1, wherein information on the second resource is transmitted together when the at least one CBG for which the NACK is received is retransmitted.

3. The method of claim 1, further comprising:
   receiving ACK/NACK information on the CBGs.

4. The method of claim 3, wherein the ACK/NACK information includes ACK/NACK for each of the CBGs.

5. The method of claim 3, wherein the ACK/NACK information includes the ACK/NACK for each of CBGs included in one transport block (TB) among the CBGs, bundled through ANDing or ORing.

6. The method of claim 5, wherein a size of a contention window of the UE is adjusted based on the ACK/NACK information.

7. The method of claim 1, wherein the first resource and the second resource are included in uplink transmission resources previously configured for the UE.

8. The method of claim 1, wherein the UE performs a listen before talk (LBT) process to determine whether another communication node currently uses a channel before transmission using the first resource.

9. The method of claim 8, wherein the UE performs the LBT process to determine whether another communication node currently uses a channel before retransmission using the second resource.

10. The method of claim 1, further comprising:
    receiving an uplink grant and transmitting a specific CBG through a resource scheduled by the uplink grant.

11. The method of claim 10, wherein ACK/NACK information on the specific CBG is received together with ACK/NACK information on the CBG transmitted using the first resource.

12. The method of claim 11, wherein the specific CBG is not retransmitted even if NACK for the specific CBG is received.

13. The method of claim 1, wherein an amount of the second resource is obtained by scaling an amount of the first resource based on the ratio in a time domain or a frequency domain.

14. The method of claim 1, wherein the retransmission is performed using the second resource if the ratio or the number of the at least one CBG is equal to or greater than a specific value, and the retransmission is performed using a resource allocated by an uplink grant if the ratio is less than the specific value.

15. The method of claim 1, wherein an amount of the second resource is a smallest value among resource amounts for transmitting the at least one CBG for which the NACK is received as a response.

16. A user equipment comprising:

a transceiver configured to transmit and receive a wireless signal; and a processor operatively coupled with the transceiver, wherein the processor is configured to transmit codeblock groups (CBGs) to a base station (BS) using a first resource in the unlicensed band, receive acknowledgement/negative acknowledgement (ACK/NACK) in response to the CBGs, and retransmit at least one CBG for which NACK is received as a response, among the CBGs, to the BS using a second resource in the unlicensed band, wherein the second resource is determined based on a ratio of a number of the at least one CBG for which the NACK is received to a number of the CBGs, and wherein, when an amount of the first resource is R, the ratio, which is obtained by dividing the number of the at least one CBG for which the NACK is received by the number of the CBGs, is S, an amount of the second resource is obtained as ceil(R×S), and the second resource is selected from a resource having a lowest index or a highest index among resources having the resource amount of R.

17. The user equipment of claim 16, wherein the user equipment communicates with at least one of a mobile terminal, a network, and an autonomous vehicle other than the user equipment.

18. A processor for a wireless communication device in a wireless communication system, the processor is configured to control the wireless communication device to transmit codeblock groups (CBGs) to a base station (BS) using a first resource in the unlicensed band, receive acknowledgement/negative acknowledgement (ACK/NACK) in response to the CBGs, and retransmit at least one CBG for which NACK is received as a response, among the CBGs, to the BS using a second resource in the unlicensed band, wherein the second resource is determined based on a ratio of a number of the at least one CBG for which the NACK is received to a number of the CBGs, and wherein, when an amount of the first resource is R, the ratio, which is obtained by dividing the number of the at least one CBG for which the NACK is received by the number of the CBGs, is S, an amount of the second resource is obtained as ceil(R×S), and the second resource is selected from a resource having a lowest index or a highest index among resources having the resource amount of R.

* * * * *